US011157363B2

(12) United States Patent
Kotzur et al.

(10) Patent No.: US 11,157,363 B2
(45) Date of Patent: Oct. 26, 2021

(54) DISTRIBUTED RAID STORAGE-DEVICE-ASSISTED DATA REBUILD SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/829,124

(22) Filed: Mar. 25, 2020

(65) Prior Publication Data

US 2021/0303396 A1      Sep. 30, 2021

(51) Int. Cl.
   *G06F 11/10*     (2006.01)
   *G06F 3/06*      (2006.01)
(52) U.S. Cl.
   CPC ........ *G06F 11/1076* (2013.01); *G06F 3/0619* (2013.01); *G06F 3/0644* (2013.01); *G06F 3/0689* (2013.01)
(58) Field of Classification Search
   CPC .. G06F 11/1076; G06F 3/0619; G06F 3/0644; G06F 3/0689
   See application file for complete search history.

(56) References Cited

U.S. PATENT DOCUMENTS

| 7,246,301 B2* | 7/2007 | Chawla | G06F 11/1092 |
| | | | 714/6.2 |
| 9,384,093 B1 | 7/2016 | Aiello | |
| 10,120,769 B2* | 11/2018 | Sreedhar | G06F 11/1658 |
| 10,922,172 B2* | 2/2021 | Margetts | G06F 11/1076 |
| 2004/0068612 A1* | 4/2004 | Stolowitz | G06F 11/1076 |
| | | | 711/114 |
| 2017/0242752 A1* | 8/2017 | Lee | G06F 12/0253 |
| 2017/0255518 A1* | 9/2017 | Achtenberg | G06F 3/0644 |
| 2017/0300393 A1* | 10/2017 | Sreedhar | G06F 11/1076 |
| 2019/0065306 A1* | 2/2019 | Margetts | G06F 11/1068 |

* cited by examiner

*Primary Examiner* — Kyle Vallecillo

(74) *Attorney, Agent, or Firm* — Joseph Mencher

(57) ABSTRACT

A distributed RAID storage-device-assisted data rebuild system includes a first RAID data storage device, provided in response to data unavailability, that retrieves respective first data for a first data stripe from each of the other RAID data storage devices, performs an XOR operation on the respective first data to generate first rebuilt data for the first data stripe, and stores the first rebuilt data as part of the first data stripe. A second RAID data storage device retrieves respective second data for a second data stripe from third RAID data storage devices, performs an XOR operation on the respective second data and third data for the second data stripe stored on the second RAID data storage device to generate second rebuilt data for the second data stripe, and provides the second rebuilt data for storage on the first RAID data storage device as part of the second data stripe.

16 Claims, 26 Drawing Sheets

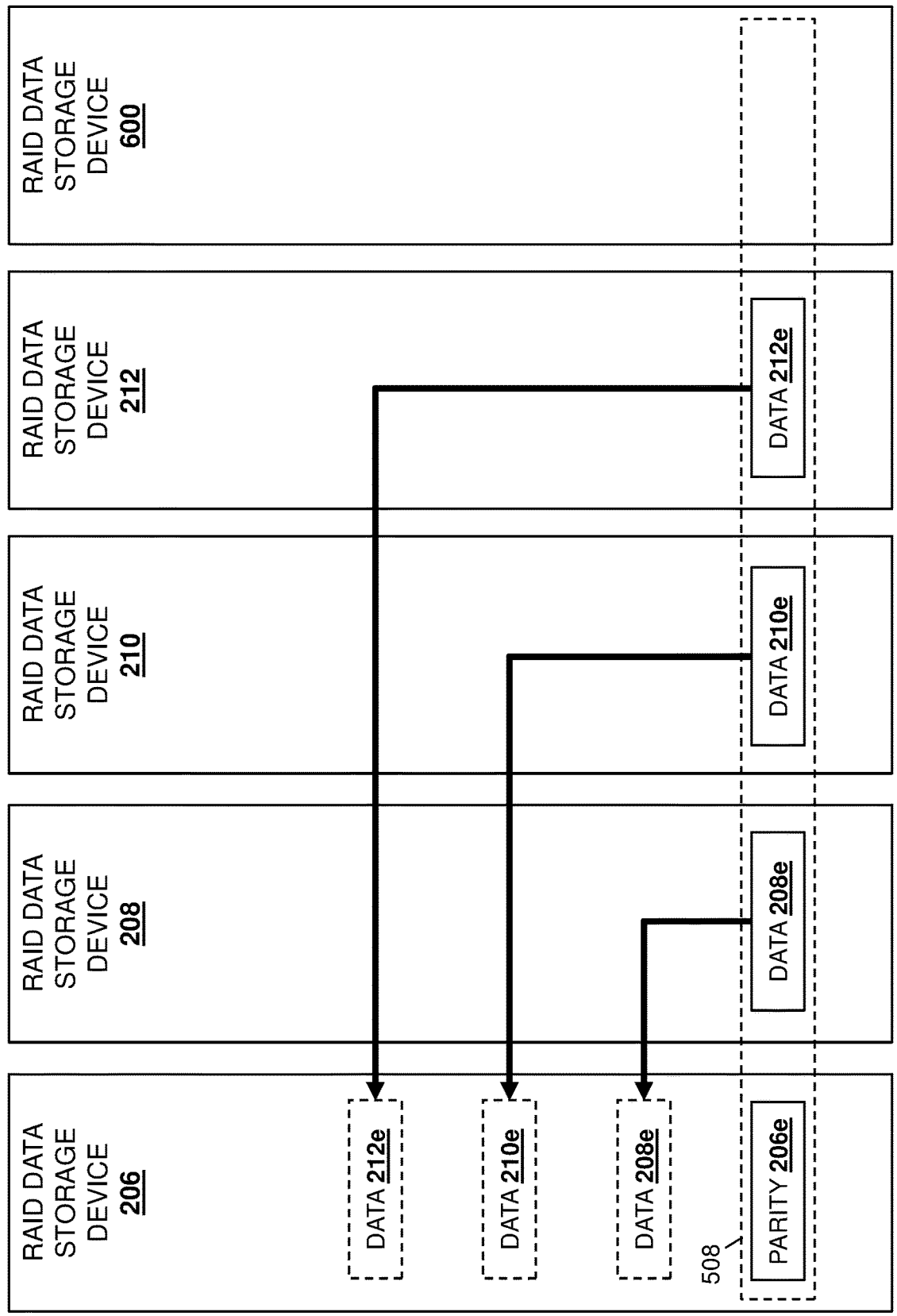

DISTRIBUTED RAID STORAGE-DEVICE-ASSISTED DATA REBUILD SYSTEM

BACKGROUND

The present disclosure relates generally to information handling systems, and more particularly to distributed data rebuilding with the assistance of "proxy" storage devices in a Redundant Array of Independent Disk (RAID) information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID data storage devices. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID data storage systems has provided for performance and efficiency improvements in RAID data storage systems. For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art, and have begun to be implemented as the RAID data storage devices discussed above in order to assist in data update operations for the RAID data storage system. The inventors of the present disclosure describe some techniques for performing RAID storage-device-assisted data updates in U.S. patent application Ser. No. 16/586,445, filed on Sep. 27, 2019, and those RAID data storage systems may utilize NVMe storage devices to perform some or all of the data update operations that are traditionally performed by a RAID storage controller device in the RAID data storage system.

However, RAID storage-device-assisted data updates may still suffer from some inefficiencies. For example, in some situations, a RAID data storage device in the RAID data storage system may fail or otherwise become unavailable such that the data that was stored on that RAID data storage device becomes unavailable, and that data must be rebuilt from the existing RAID data storage devices in the RAID data storage system, and stored on a replacement RAID data storage device. In such a situation, the replacement RAID data storage device must generate respective rebuilt data for each stripe being stored by the RAID data storage system. One of skill in the art will recognize that conventional data rebuilding operations require, for each stripe stored on the RAID data storage system, the replacement RAID data storage device to retrieve data for that stripe from each of the other RAID data storage devices, perform an XOR operation on that data to generate the respective rebuilt data for that stripe for storage on the replacement RAID data storage device, and store that respective rebuilt data. As such, the replacement RAID data storage device handles all data transfers involved in the data rebuilding operations, and can become a bottleneck in the data rebuilding process, particularly as the number of RAID data storage devices included in the RAID data storage system increase, and the number of stripes being stored on the RAID data storage system increase (i.e., the replacement RAID data storage device has a limited number of data a transfer lanes available to perform the data transfer operations discussed above with the other RAID data storage devices in the RAID data storage system.)

Accordingly, it would be desirable to provide a RAID storage-device-assisted data rebuild system that addresses the issues discussed above.

SUMMARY

According to one embodiment, an Information Handling System (IHS) includes a storage subsystem; a processing system that is coupled to the storage subsystem; and a memory system that is coupled to the processing system and that includes instructions that, when executed by the processing system, cause the processing system to provide a distributed Redundant Array of Independent Disks (RAID) storage-device-assisted data rebuild engine that is configured to: retrieve, from each of a plurality of first RAID data storage devices that are included in a RAID data storage system that stores a plurality of data stripes, respective first data for first data stripe; perform an XOR operation on the respective first data for the first data stripe and second data for the first data stripe that is stored on the storage subsystem to generate first rebuilt data for the first data stripe; and provide, to a second RAID data storage device that has been provided in the RAID data storage system in response to unavailability of data in the plurality of data stripes, the first rebuilt data for storage as part of the first data stripe.

BRIEF DESCRIPTION OF THE DRAWINGS

FIG. 100 is a schematic view illustrating an embodiment of the RAID data storage system of FIG. 2 operating during the method of FIGS. 4A and 4B.

FIG. 13A is a schematic view illustrating an embodiment of the RAID data storage system of FIG. 2 operating during the method of FIGS. 4A and 4B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
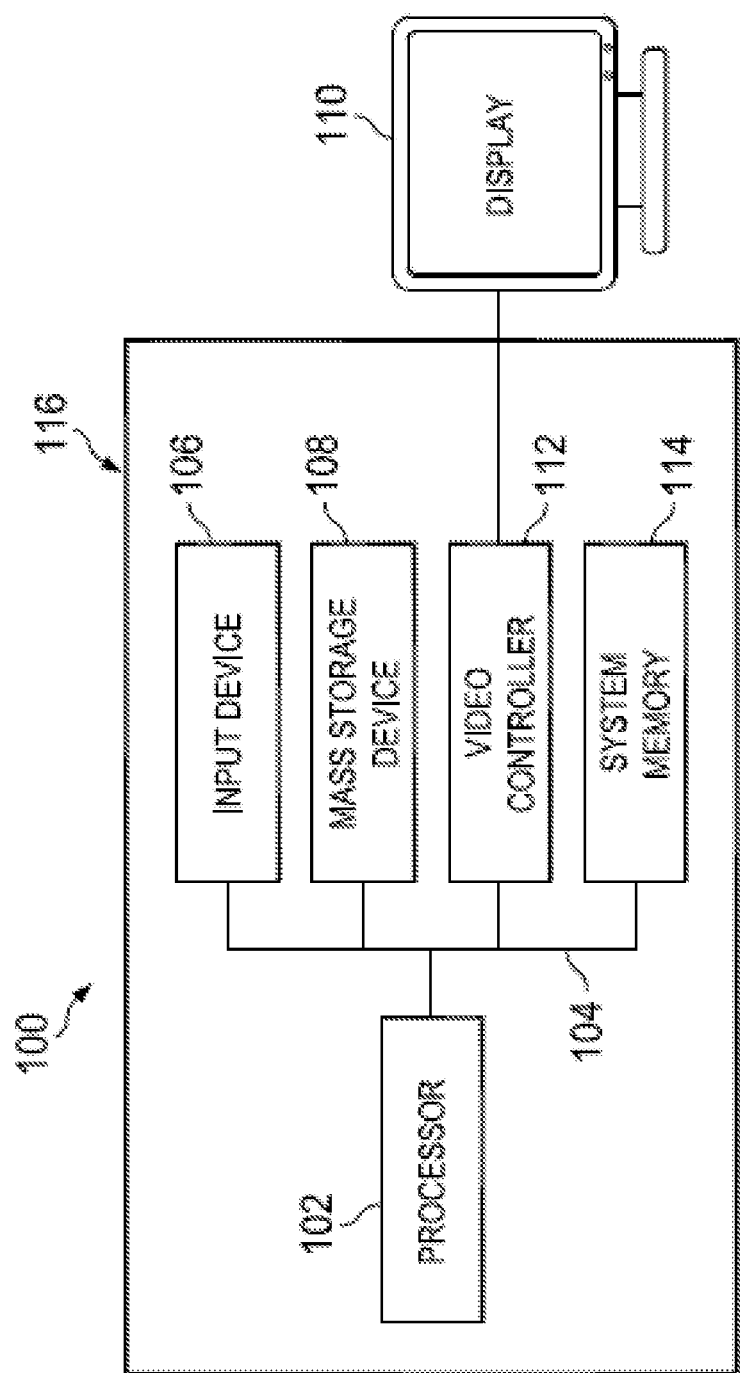
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
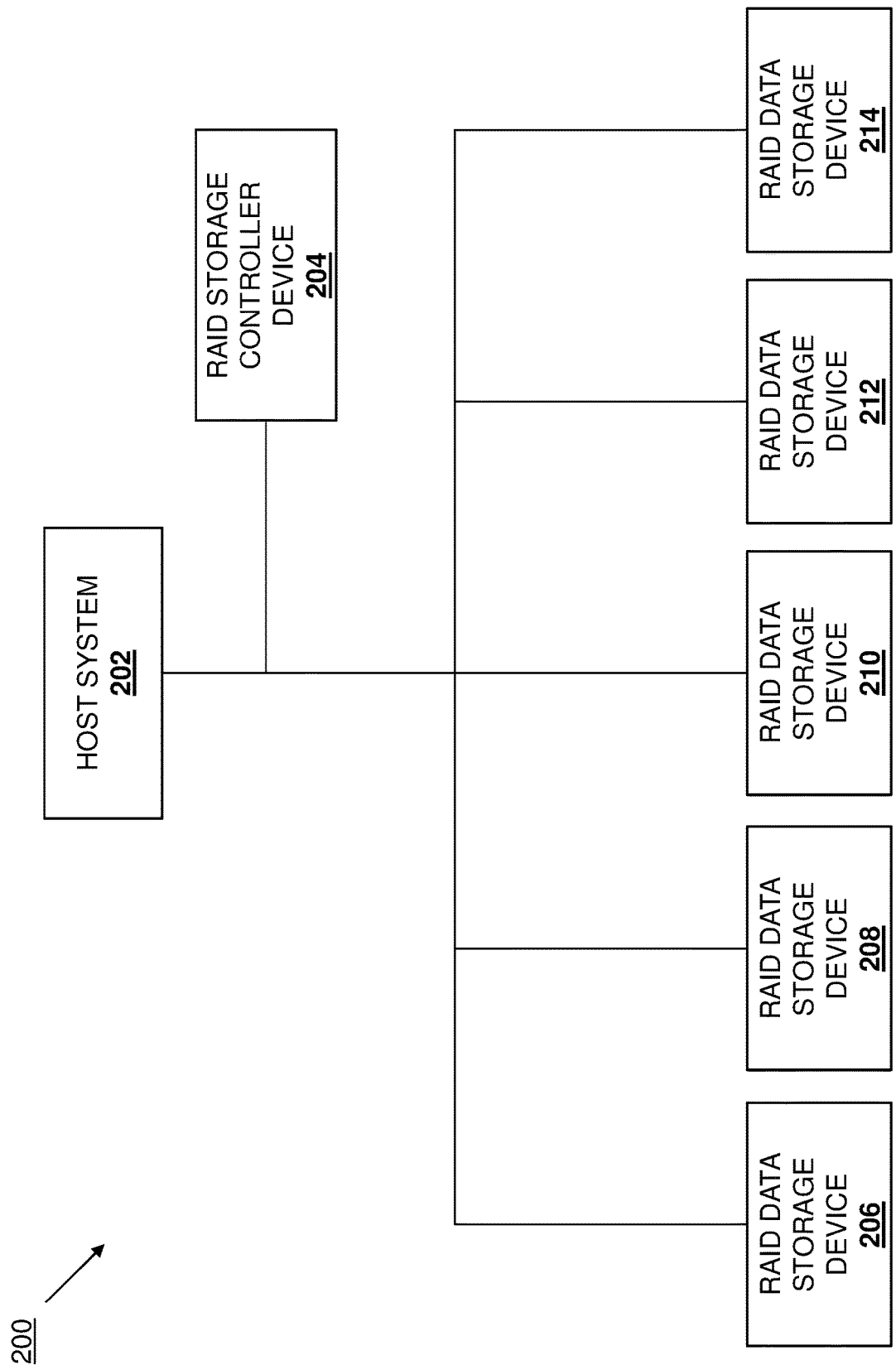
FIG. 2 is a schematic view illustrating an embodiment of a RAID data storage system.

Referring now to FIG. 2, an embodiment of a Redundant Array of Independent Disks (RAID) storage system 200 is illustrated. In the illustrated embodiment, the RAID data storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID data storage system 200 also includes a RAID storage controller device 204 that is coupled to the host system 202 in a "look-aside" RAID storage controller device configuration that, as discussed below, couples the RAID storage controller device 204 to the host system 202 and each of the RAID data storage devices 206-214 (discussed below) without positioning the RAID storage controller device 204 between the host system 202 and the RAID data storage devices 206-214. In an embodiment, the RAID storage controller device 204 may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units. In the discussion below, the RAID storage controller device 204 includes a processing system, and a memory system that is coupled to the processing system and that includes instructions that, when executed by the processing system, cause the processing system to provide a RAID storage controller engine that is configured to perform the functions of the RAID storage controller engines and RAID storage controller devices discussed below.

Furthermore, the RAID data storage system 200 also includes a plurality of RAID data storage devices 206, 208, 210, 212, and 214, each of which is coupled to the host system 202 and the RAID storage controller device 204. As discussed above, FIG. 2 illustrates how the RAID storage controller device 204 may be provided in a "look-aside" RAID storage controller device configuration that couples the RAID storage controller device 204 to the host system 202 and each of the RAID data storage devices 206-214, and without positioning the RAID storage controller device 204 between the host system 202 and the RAID data storage devices 206-214. As will be appreciated by one of skill in the art in possession of the present disclosure, the "look-aside" RAID storage controller device configuration provides the RAID data storage devices 206-214 direct access to the host system 202 independent of the RAID storage controller device 204, which allows many conventional RAID storage controller operations to be offloaded from the RAID storage controller device 204 by the RAID data storage devices 206-210. However, one of skill in the art in possession of the present disclosure will appreciate how the teachings of the present disclosure may be applied to "in-line" RAID storage controller device configurations that provide the RAID storage controller device between the host device and the RAID storage devices 206-214 while remaining within the scope of the present disclosure as well.

As will be appreciated by one of skill in the art in possession of the present disclosure, the RAID data storage devices in the RAID data storage system 200 of FIG. 2 are described as operating in a RAID 5 configuration, but other RAID configurations may benefit from the teachings of the present disclosure and thus are envisioned as falling within its scope as well. In a specific example, the RAID storage devices 206-214 in the RAID storage system 200 may be provided in a RAID 6 (or "double-parity" RAID) configuration that utilizes two parity strips on each RAID storage device, and allows for two RAID storage device failures within the RAID storage system 200 before any data is lost, and one of skill in the art in possession of the present disclosure will appreciate how the teachings below may be extended to distributed RAID storage-device-assisted data rebuilds for Parity (P) and Q data utilized in such RAID storage systems while remaining within the scope of the present disclosure as well.

As such, while a few RAID data storage devices in a particular configuration are illustrated, one of skill in the art in possession of the present disclosure will recognize that many more storage devices may (and typically will) be coupled to the RAID storage controller device 204 (e.g., in a datacenter) and may be provided in other RAID configurations while remaining within the scope of the present disclosure. In the embodiments discussed below, the RAID data storage devices 206-214 are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID data storage system 200 has been illustrated and described, one of skill in the art in possession of the present disclosure will recognize that the RAID data storage system of the present disclosure may include a variety of components and component configurations while remaining within the scope of the present disclosure as well.

Figure 3:
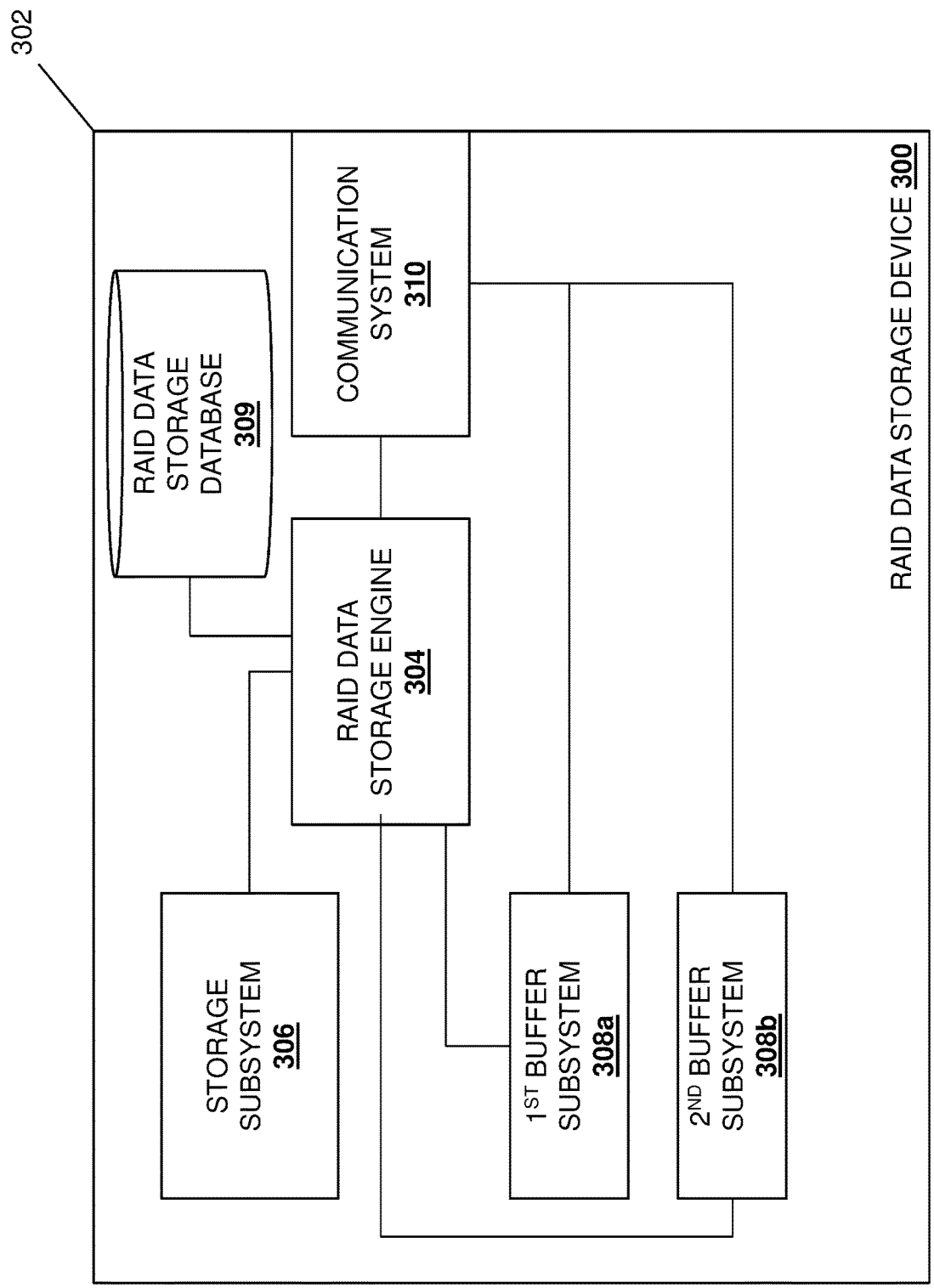
FIG. 3 is a schematic view illustrating an embodiment of a RAID data storage device 300 that may be provided in the RAID data storage system of FIG. 2.

Referring now to FIG. 3, an embodiment of a RAID data storage device 300 is illustrated that may provide any or all of the RAID data storage devices 206-214 discussed above with reference to FIG. 2. As such, the RAID data storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID data storage device 300 includes a chassis 302 that houses the components of the RAID data storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID data storage engine 304 that is configured to perform the functionality of the RAID data storage engines and/or RAID data storage devices discussed below. While not illustrated, one of skill in the art in possession of the present disclosure will recognize that the RAID data storage engine 304 may include, or be coupled to, other components such as a queues (e.g., submission queues and completion queues) and/or RAID data storage device components that would be apparent to one of skill in the art in possession of the present disclosure.

The chassis 302 may also house a storage subsystem 306 that is coupled to the RAID data storage engine 304 (e.g., via a coupling between the storage subsystem 306 and the processing system). Continuing with the example provided above in which the RAID data storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID data storage engine 304 (e.g., via a coupling between the first buffer subsystem 308a and the processing system). Continuing with the example provided above in which the RAID data storage device 300 is an NVMe SSD storage device, the first buffer subsystem 308a may be provided by device buffer that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID data storage engine 304 (e.g., via a coupling between the second buffer subsystem 308b and the processing system). Continuing with the example provided above in which the RAID data storage device 300 is an NVMe SSD storage device, the second buffer subsystem 308b may be provided by a Controller Memory Buffer (CMB) subsystem. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID data storage engine 304 (e.g., via a coupling between the storage system and the processing system) and that includes a RAID storage database 309 that is configured to store any of the information utilized by the RAID data storage engine 304 as discussed below.

The chassis 302 may also house a communication system 310 that is coupled to the RAID data storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID data storage device 300 is an NVMe SSD storage device, the communication system 310 may include any NVMe SSD storage device communication component that enables Direct Memory Access (DMA) operations as described below, submission and completion queues, as well as any other components that provide NVMe SSD storage device communication functionality that would be apparent to one of skill in the art in possession of the present disclosure. While a specific RAID data storage device 300 has been illustrated, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4A:
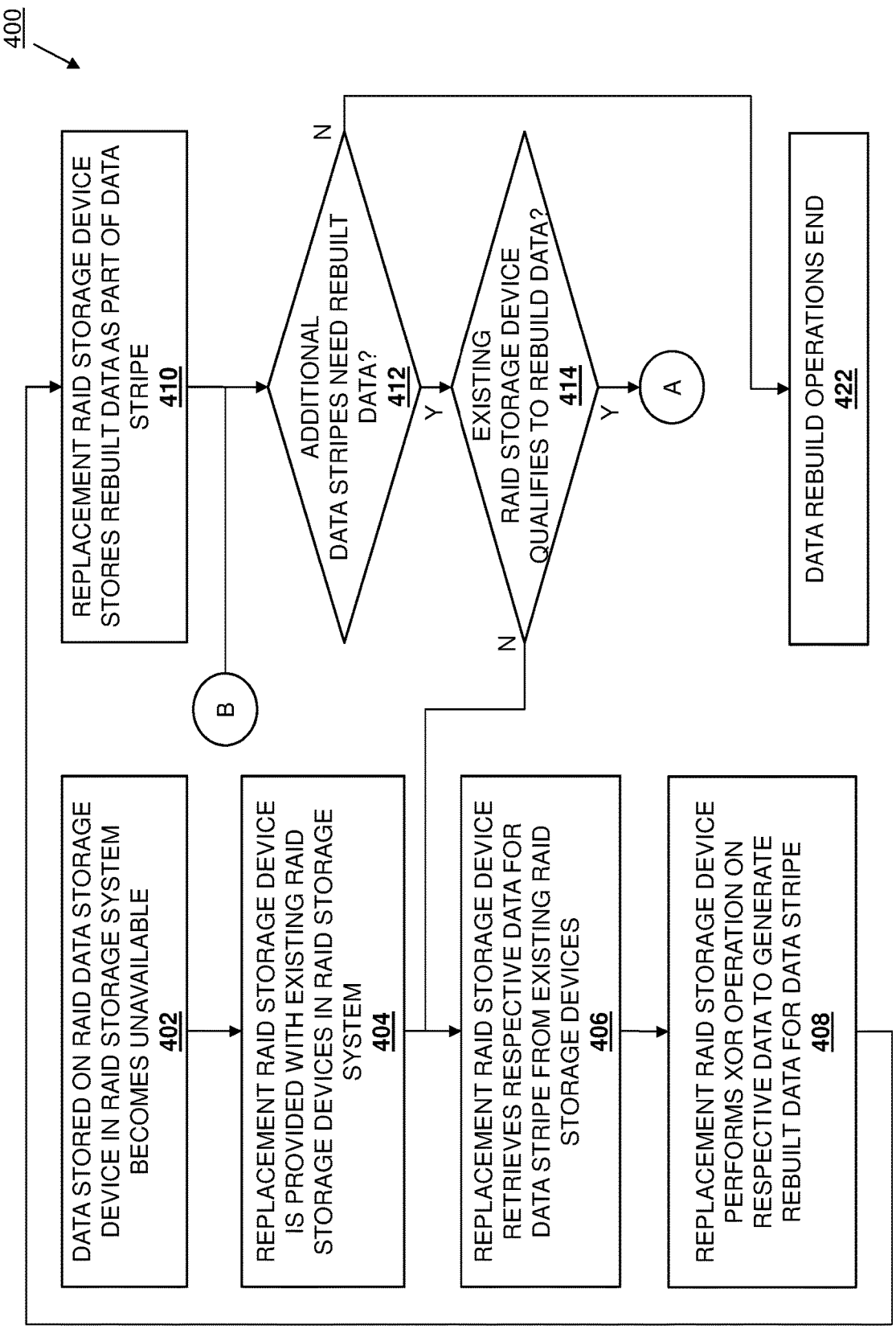
FIG. 4A is a flow chart illustrating an embodiment of a portion of a method for providing distributed RAID storage-device-assisted data rebuilds.
Figure 4B:
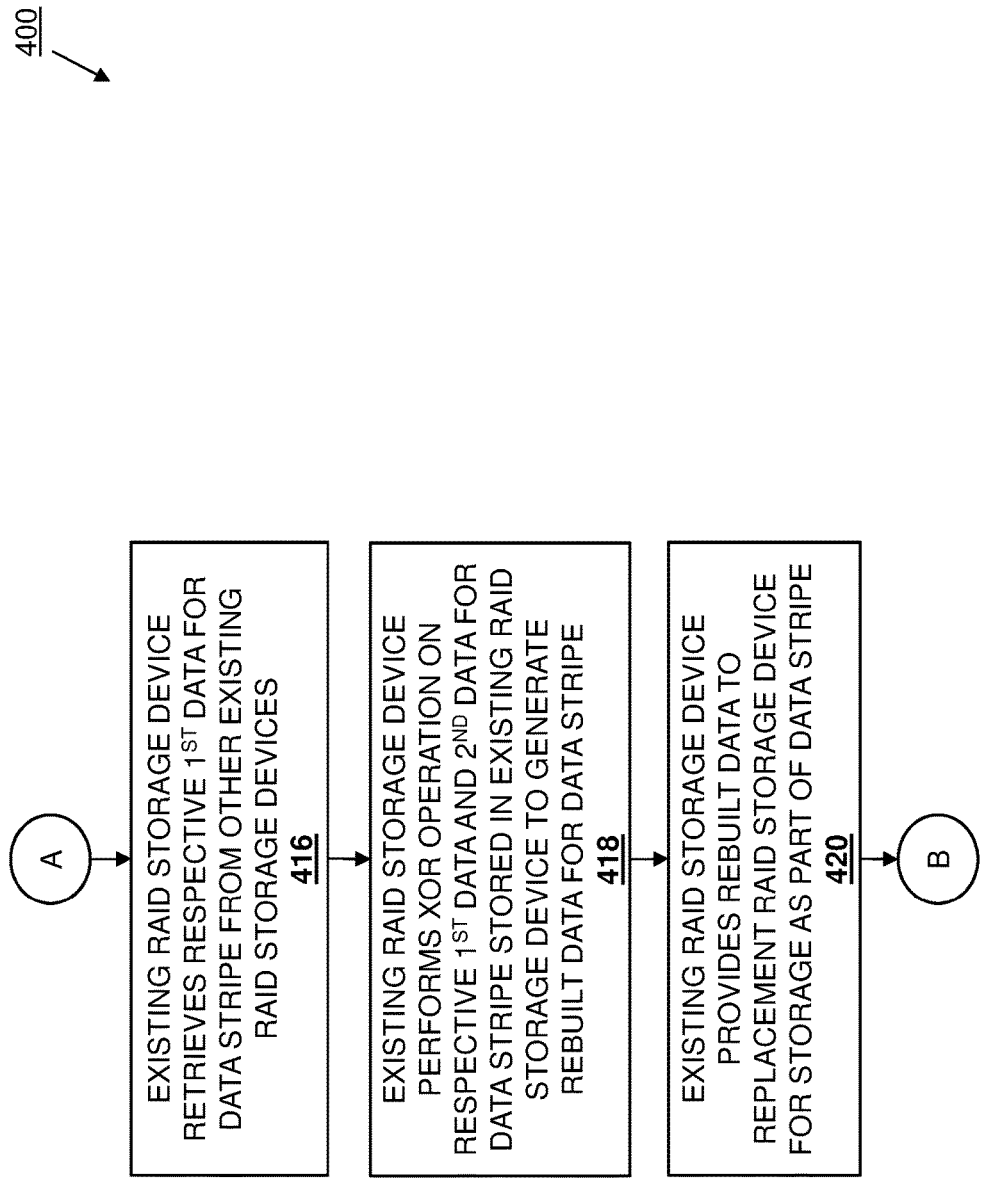
FIG. 4B is a flow chart illustrating an embodiment of a portion of the method of FIG. 4A.

Referring now to FIGS. 4A and 4B, an embodiment of a method 400 for providing distributed RAID storage-device-assisted data rebuilds is illustrated. As discussed below, the systems and methods of the present disclosure provide for the distribution of data rebuild operations for a replacement RAID data storage device between that replacement RAID data storage device and the existing RAID data storage devices that store the data that is being used to rebuild data for the replacement RAID data storage device. For example, a RAID data storage system that stores a plurality of data stripes on a plurality of RAID data storage devices may include existing RAID data storage devices, along with a replacement RAID data storage device that has been provided in the RAID data storage system in response to an unavailability of data in the plurality of data stripes. In a specific example, for a first data stripe stored on the RAID data storage system, the replacement RAID data storage device may retrieve respective first data for the first data stripe from each of the existing RAID data storage devices, perform an XOR operation on the respective first data for the first data stripe to generate first rebuilt data for the first data stripe, and store the first rebuilt data in the replacement RAID data storage device as part of the first data stripe. Furthermore, for a second data stripe included in the plurality of data stripes, a first existing RAID data storage device may retrieve respective second data for the second data stripe from each of a plurality of second existing RAID data storage devices, perform an XOR operation on the respective second data for the second data stripe and second data for the second data stripe that is stored on the first existing RAID data storage device to generate second rebuilt data for the second data stripe, and provide the second rebuilt data for storage on the replacement RAID data storage device as part of the second data stripe.

As discussed below, for subsequent data stripes stored in the RAID data storage system (e.g., following the first and second data stripes discussed above), the next existing RAID data storage device may perform operations similar to those described above by the first existing RAID data storage device on that subsequent data stripe, and when each existing RAID data storage device is performing data rebuild operations for a data stripe, the process described above may repeat such that the replacement RAID data storage device performs data rebuild operations for another data stripe, each of the existing RAID data storage devices perform data rebuild operations for another data stripe as well, and so on until all of the unavailable data is rebuilt for storage on the replacement RAID data storage device and the data stripes stored on the RAID data storage system are coherent/complete. Thus, all of the data rebuild operations for a replacement RAID data storage device are not "piled on" that replacement RAID data storage device, and rather the data rebuild operations may be distributed across the replacement RAID data storage device and existing RAID data storage devices that act as "data rebuild proxies" for the replacement RAID data storage device, thus eliminating the data rebuild bottleneck provided by the replacement RAID data storage device in conventional RAID data storage systems, reducing the bandwidth utilized for data rebuild operations relative to conventional RAID data storage systems, speeding up the data rebuild process relative to conventional RAID data storage systems, and providing other benefits that would be apparent to one of skill in the art in possession of the present disclosure.

Figure 5:
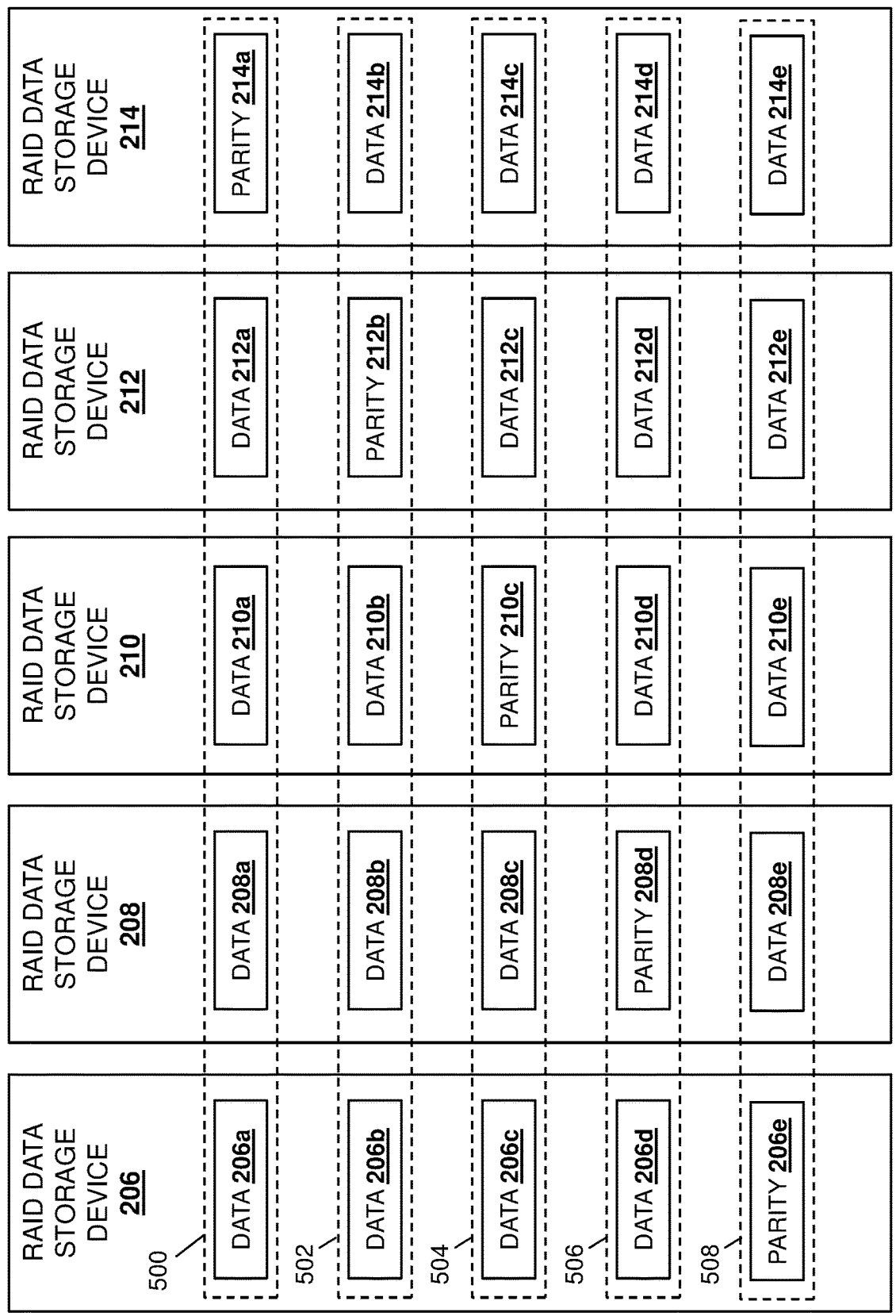
FIG. 5 is a schematic view illustrating an embodiment of the RAID data storage system of FIG. 2 operating during the method of FIGS. 4A and 4B.

The method 400 begins at block 402 where data stored on a data storage device in a RAID data storage system becomes unavailable. With reference to FIG. 5, an embodiment of data stored on the RAID data storage devices 206-214 is illustrated for purposes of the discussion below. In that embodiment, a first data stripe 500 is illustrated as stored on the RAID data storage system 200, with the first data stripe 500 including primary data 206a stored on the RAID data storage device 206, primary data 208a stored on the RAID data storage device 208, primary data 210a stored on the RAID data storage device 210, primary data 212a stored on the RAID data storage device 212, and parity data 214a stored on the RAID data storage device 214. In that embodiment, a second data stripe 502 is also illustrated as stored on the RAID data storage system 200, with the second data stripe 502 including primary data 206b stored on the RAID data storage device 206, primary data 208b stored on the RAID data storage device 208, primary data 210b stored on the RAID data storage device 210, parity data 212b stored on the RAID data storage device 212, and primary data 214b stored on the RAID data storage device 214.

In that embodiment, a third data stripe 504 is also illustrated as stored on the RAID data storage system 200, with the third data stripe 504 including primary data 206c stored on the RAID data storage device 206, primary data 208c stored on the RAID data storage device 208, parity data 210c stored on the RAID data storage device 210, primary data 212c stored on the RAID data storage device 212, and primary data 214c stored on the RAID data storage device 214. In that embodiment, a fourth data stripe 506 is also illustrated as stored on the RAID data storage system 200, with the fourth data stripe 506 including primary data 206d stored on the RAID data storage device 206, parity data 208d stored on the RAID data storage device 208, primary data 210d stored on the RAID data storage device 210, primary data 212d stored on the RAID data storage device 212, and primary data 214d stored on the RAID data storage device 214. In that embodiment, a fifth data stripe 508 is also illustrated as stored on the RAID data storage system 200, with the fifth data stripe 508 including parity data 206e stored on the RAID data storage device 206, primary data 208e stored on the RAID data storage device 208, primary data 210e stored on the RAID data storage device 210, primary data 212e stored on the RAID data storage device 212, and primary data 214e stored on the RAID data storage device 214.

As will be appreciated by one of skill in the present disclosure, the parity data in any of the data stripes discussed above may be created by performing an XOR operation on the primary data in that data stripe, and also allows for the rebuilding of primary data included in its data stripe the event that primary data becomes unavailable (e.g., if the primary data 206a becomes unavailable, an XOR operations performed on the parity data 214a and the primary data 208a, 210a, and 212a will produce/"rebuild" the primary data 206a.) Furthermore, while only five data stripes are illustrated and described in FIG. 5 and the examples below, as discussed below the RAID data storage system 200 may store many more data stripes that are similar to the data stripes 500-508 discussed above while remaining within the scope of the present disclosure.

Figure 6A:
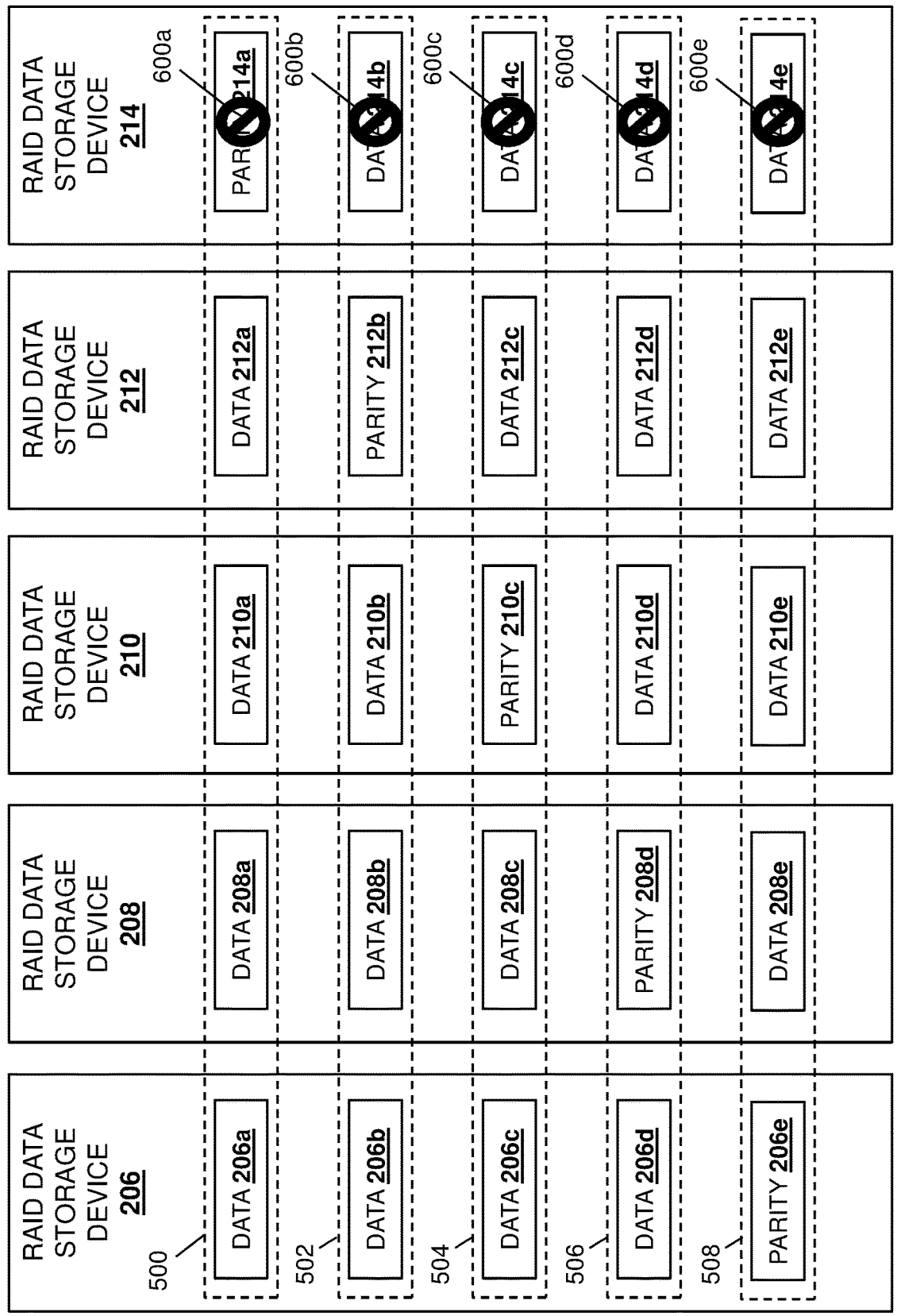
FIG. 6A is a schematic view illustrating an embodiment of the RAID data storage system of FIG. 2 operating during the method of FIGS. 4A and 4B.

In an embodiment, at block 402, one of the RAID data storage devices 206-214 may fail, become corrupted, and/or otherwise become unavailable such that the data stored on that RAID data storage device becomes unavailable. For example, FIG. 6A illustrates an embodiment in which the RAID data storage device 214 has failed, become corrupted, and/or otherwise become unavailable such that the parity data 214a stored in the RAID data storage device 214 for the first data stripe 500 has become unavailable (as indicated by element 600a in FIG. 6A), the primary data 214b stored in the RAID data storage device 214 for the second data stripe 502 has become unavailable (as indicated by element 600b in FIG. 6A), the primary data 214c stored in the RAID data storage device 214 for the third data stripe 504 has become unavailable (as indicated by element 600c in FIG. 6A), the primary data 214d stored in the RAID data storage device 214 for the fourth data stripe 506 has become unavailable (as indicated by element 600d in FIG. 6A), and the primary data 214e stored in the RAID data storage device 214 for the fifth data stripe 508 has become unavailable (as indicated by element 600e in FIG. 6A). However, while a specific example of unavailable data on an unavailable RAID data storage device has been described, one of skill in the art in possession of the present disclosure will appreciate that the teachings of the present disclosure may be beneficial for data that is unavailable for any reason, as well as partial data unavailability (e.g., when only a subset of the data stored on a RAID data storage device has become unavailable), and/or in a variety of other data unavailability scenarios while remaining within the scope of the present disclosure.

Figure 6B:
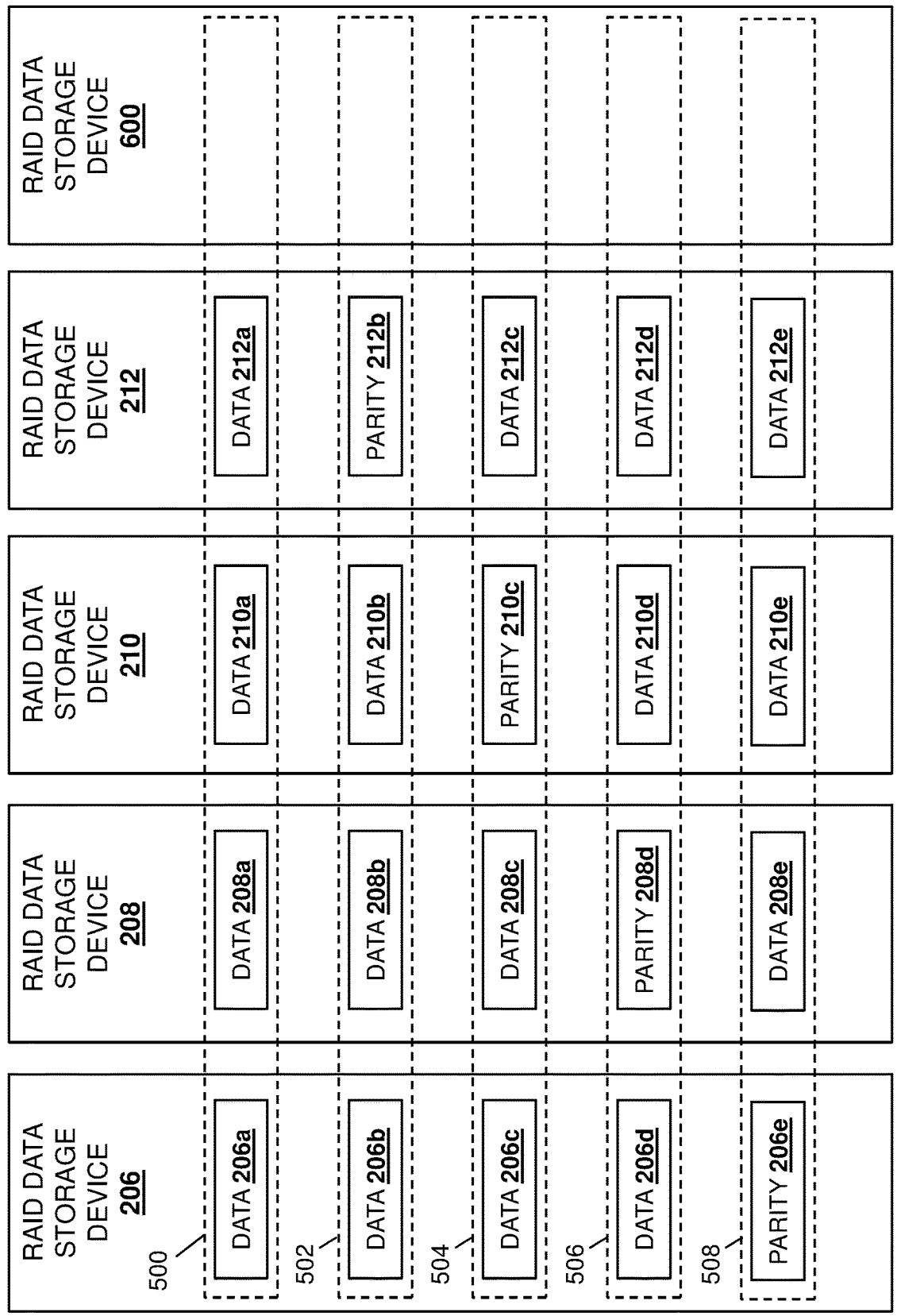
FIG. 6B is a schematic view illustrating an embodiment of the RAID data storage system of FIG. 2 operating during the method of FIGS. 4A and 4B.

The method 400 then proceeds to block 404 where a replacement RAID data storage device is provided with existing RAID data storage devices in the RAID data storage system. In an embodiment, at block 404, a "replacement" RAID data storage device may be provided in the RAID data storage system 200 in place of the RAID data storage device that failed, became corrupted, and/or otherwise became unavailable such that the data stored on that RAID data storage device became unavailable. For example, FIG. 6B illustrates how a RAID data storage device 600 may be provided in the RAID data storage system 200 in place of the RAID data storage device 214. However, while the RAID data storage device 600 is illustrated and described as a "new" or different RAID data storage device that has been provided to replace the failed, corrupted, and/or otherwise unavailable RAID data storage device 214, one of skill in the art in possession of the present disclosure will appreciate that the RAID data storage device 600 may be the RAID data storage device 214 that has been repaired, rehabilitated, and/or otherwise made available following its failure, corruption, and/or other unavailability while remaining within the scope of the present disclosure as well.

Figure 7A:
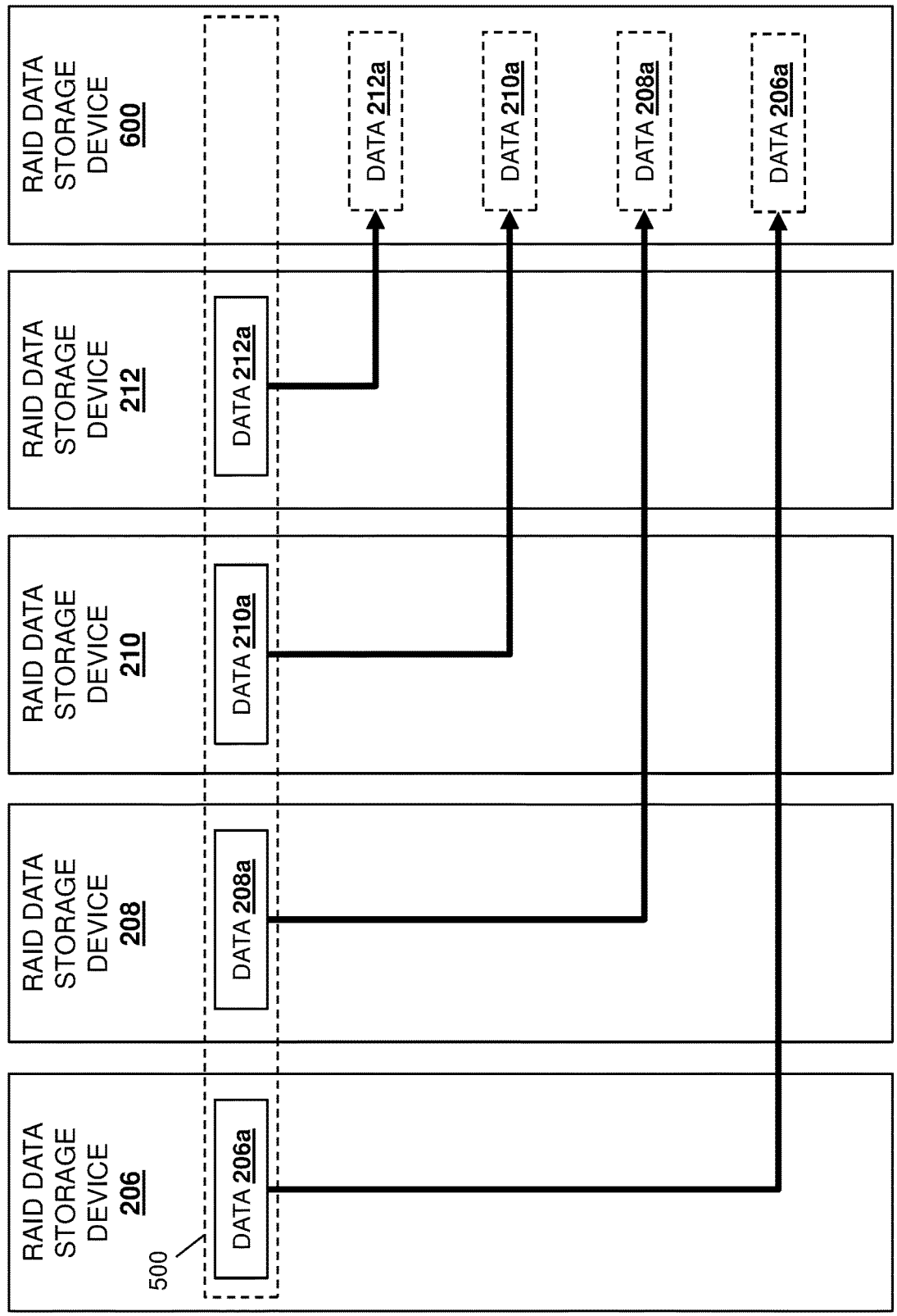
FIG. 7A is a schematic view illustrating an embodiment of the RAID data storage system of FIG. 2 performing conventional data rebuild operations.
Figure 7B:
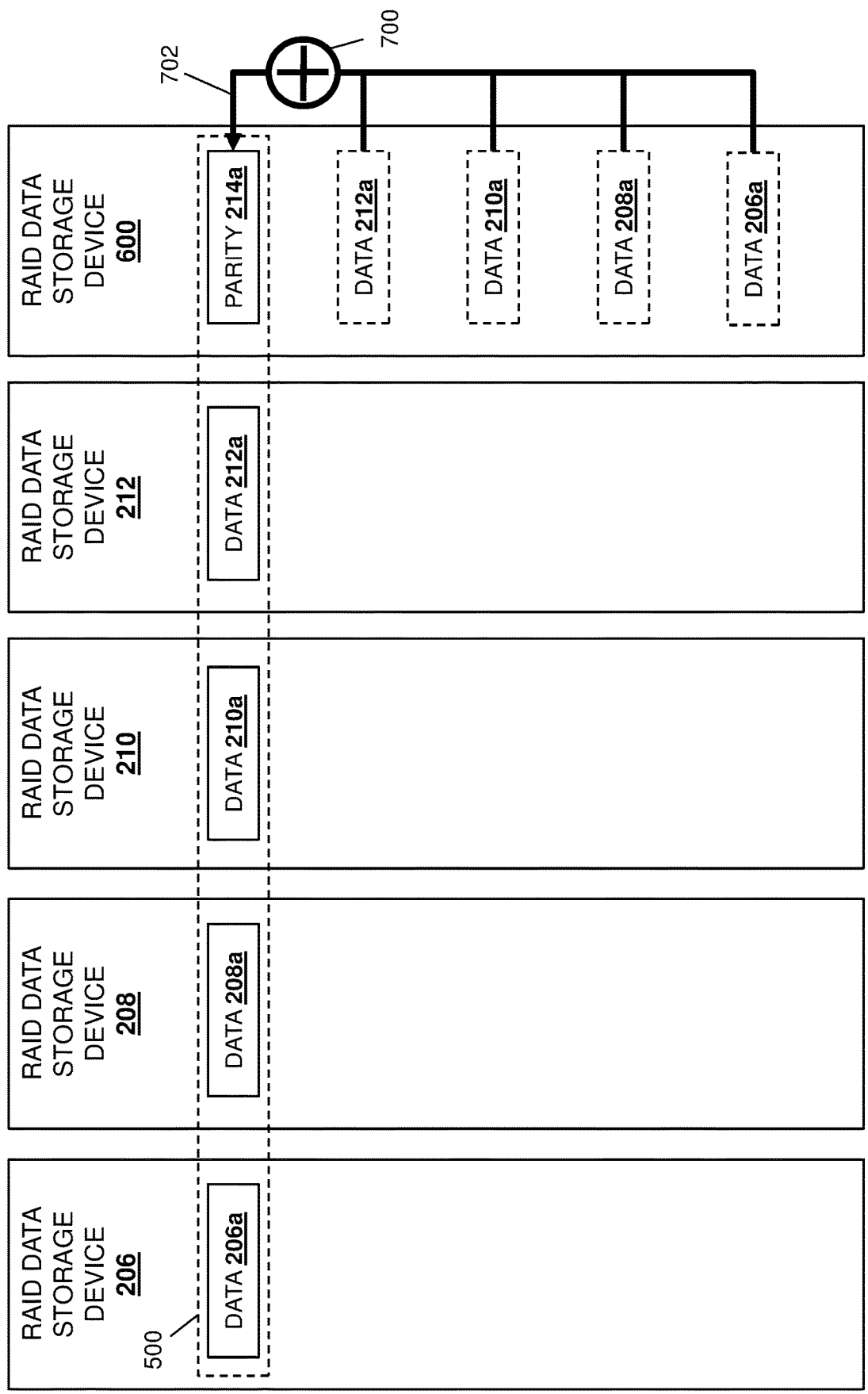
FIG. 7B is a schematic view illustrating an embodiment of the RAID data storage system of FIG. 2 performing conventional data rebuild operations.

Prior to proceeding with the discussion of the remainder of the method 400, conventional data rebuild operations are discussed below in order to contrast them with the data rebuild operations provided according to the teachings of the present disclosure. In response to the provisioning of the RAID data storage device 600 in the RAID data storage system 200, the RAID data storage engine 304 in the RAID data storage device 300/600 may operate to perform conventional data rebuild operations that rebuild the parity data 214a and/or the primary data 214b, 214c, 214d, and/or 214e (any of which become unavailable similarly as discussed above.) For example, FIG. 7A illustrates how the RAID data storage engine 304 in the RAID data storage device 300/600 may operate to retrieve the primary data 206a stored in the RAID data storage device 206 for the first data stripe 500, the primary data 208a stored in the RAID data storage device 208 for the first data stripe 500, the primary data 210a stored in the RAID data storage device 210 for the first data stripe 500, and the primary data 212a stored in the RAID data storage device 212 for the first data stripe 500. Furthermore, FIG. 7B illustrates how the RAID data storage engine 304 in the RAID data storage device 300/600 may operate to perform an XOR operation 700 on the primary data 206a, 208a, 210a, and 212a in order to generate the rebuilt parity data 214a, and perform storage operations 702 to store that rebuilt parity data 214a in the storage subsystem 306 of the RAID data storage device 300/600 as part of the first data stripe 500 (e.g., as described by the inventors in U.S. patent application Ser. No. 16/586,445, filed on Sep. 27, 2019.)

Figure 8A:
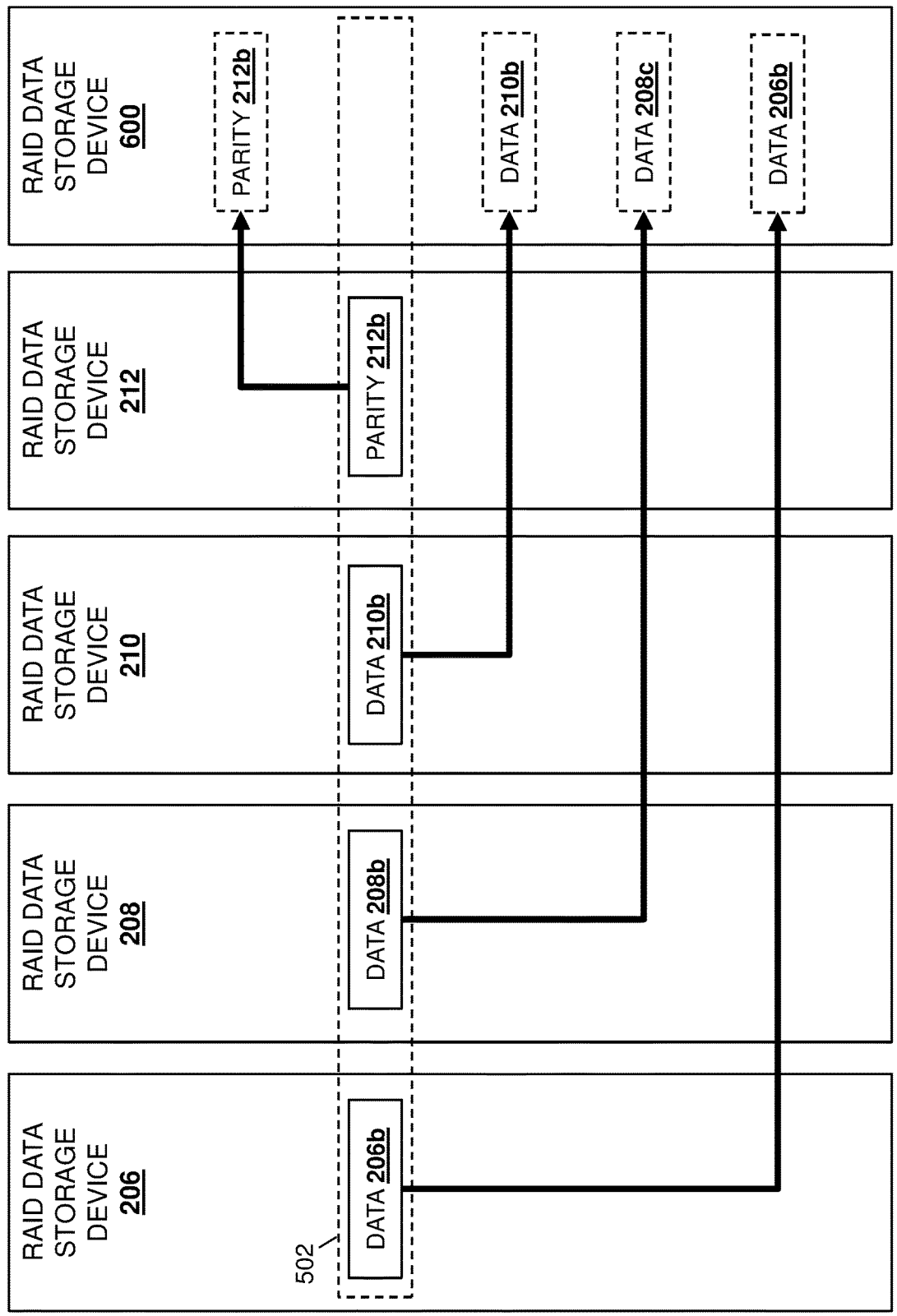
FIG. 8A is a schematic view illustrating an embodiment of the RAID data storage system of FIG. 2 performing conventional data rebuild operations.
Figure 8B:
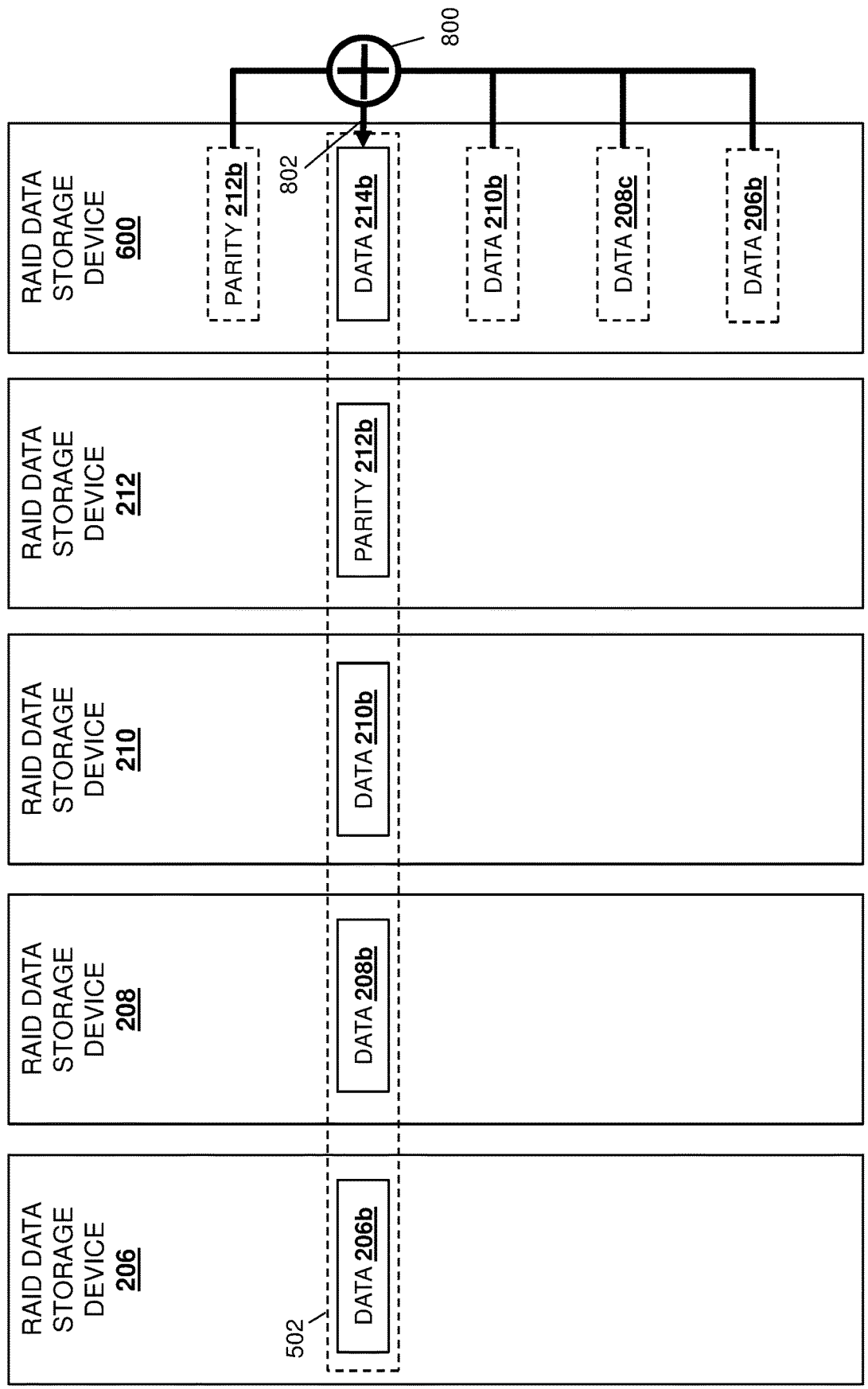
FIG. 8B is a schematic view illustrating an embodiment of the RAID data storage system of FIG. 2 performing conventional data rebuild operations.

Continuing with the example of the conventional data rebuild operations discussed above, FIG. 8A illustrates how the RAID data storage engine 304 in the RAID data storage device 300/600 may operate to retrieve the primary data 206b stored in the RAID data storage device 206 for the second data stripe 502, the primary data 208b stored in the RAID data storage device 208 for the second data stripe 502, the primary data 210b stored in the RAID data storage device 210 for the second data stripe 502, and the parity data 212b stored in the RAID data storage device 212 for the second data stripe 502. Furthermore, FIG. 8B illustrates how the RAID data storage engine 304 in the RAID data storage device 300/600 may operate to perform an XOR operation 800 on the primary data 206b, 208b, and 210b, and the parity data 212b in order to generate the primary data 214b, and perform storage operations 802 to store that primary data 214b in the storage subsystem 306 of the RAID data storage device 300/600 as part of the second data stripe 502.

As will be appreciated by one of skill in the art in possession of the present disclosure, the RAID data storage engine 304 in the RAID data storage device 300/600 may then operate to perform conventional data rebuild operations that are similar to those discussed above in order to rebuild the primary data 214c for the third data stripe 504, the primary data 214d for the fourth data stripe 506, and the primary data 214e for the fifth data stripe 508, as well as similar conventional data rebuild operations for any other data stripes stored in the RAID data storage system 200. As such, data rebuild operations are particularly resource intensive for the replacement RAID data storage device. For example, in a RAID data storage system with 16 RAID data storage devices in a RAID 5 configuration, the replacement RAID data storage device will perform 15 read/XOR operations for each data stripe.

One of skill in the art in possession of the present disclosure will recognize that such conventional data rebuild operations may be limited by the storage device interface of the replacement RAID data storage device, the target media, and/or other factors associated with the replacement RAID data storage device performing all of the data rebuild operations. For example, the replacement RAID data storage device may include a limited number of data transfer lanes upon which it may transfer the primary (and in many cases parity) data from the other RAID data storage devices 206-212, which can result in the RAID data storage device 600 providing a "bottleneck" to the data rebuilding process. As discussed below, the systems and methods of the present disclosure remedy these issues by distributing the data rebuild operations for any particular RAID data storage device between multiple RAID data storage devices in the RAID data storage system 200.

Figure 9A:
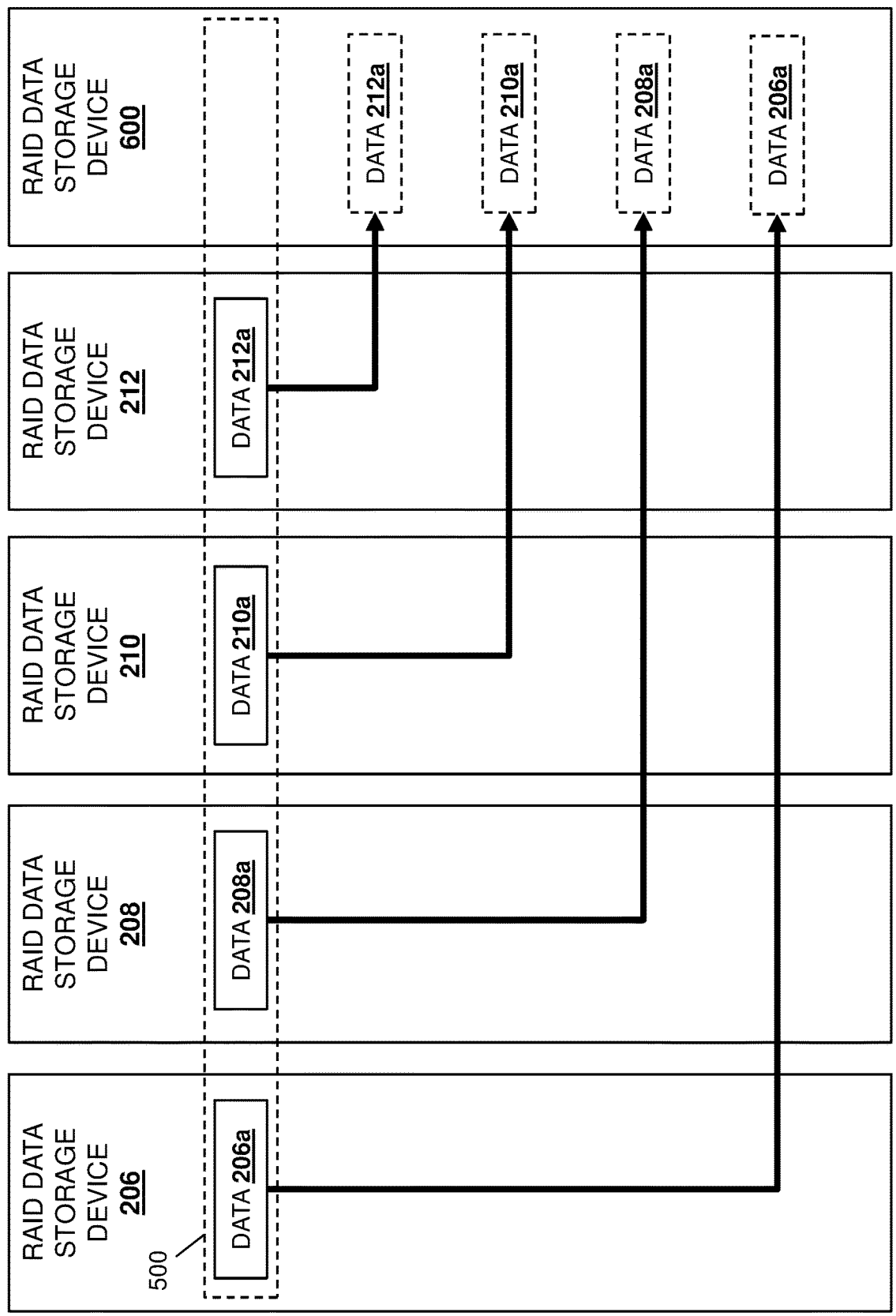
FIG. 9A is a schematic view illustrating an embodiment of the RAID data storage system of FIG. 2 operating during the method of FIGS. 4A and 4B.

The method 400 then proceeds to block 406 where the replacement RAID data storage device retrieves respective data for a data stripe from the existing RAID data storage devices. With reference to FIG. 9A, in an embodiment of block 406, the RAID data storage engine 304 in the RAID data storage device 300/600 may operate to retrieve/receive the primary data 206a stored in the RAID data storage device 206 for the first data stripe 500, the primary data 208a stored in the RAID data storage device 208 for the first data stripe 500, the primary data 210a stored in the RAID data storage device 210 for the first data stripe 500, and the primary data 212a stored in the RAID data storage device 212 for the first data stripe 500. In one embodiment, at block 406, the RAID data storage engine 304 in the RAID data storage device 300/600 may perform a "read peers" RAID operation in order to read the primary data 206a, 208a, 210a, and 212a from the RAID data storage devices 206, 208, 210, and 212, respectively.

For example, the "read peers" RAID operation performed by the RAID data storage engine 304 in the RAID data storage device 300/600 may include a "pull" operation that is performed in response to the RAID storage controller device 204/transmitting an instruction to each of the RAID data storage devices 206, 208, 210, and 212 that causes the RAID data storage engine 304 in those RAID data storage devices 206, 208, 210, and 212 to write their respective primary data 206a, 208a, 210a, and 212a to their respective second buffer subsystems 308b (e.g., their respective CMB subsystems.) Subsequently, the RAID data storage engine 304 in the RAID data storage device 300/600 may perform respective read operations to read the respective primary data 206a, 208a, 210a, and 212a from the respective second buffer subsystems 308b in the RAID data storage devices 206, 208, 210, and 212, respectively, and then store that primary data 206a, 208a, 210a, and 212a in its second buffer subsystem 308b (e.g., a CMB subsystem in the RAID data storage device 600.)

In another example, the "read peers" RAID operation performed by the RAID data storage engine 304 in the RAID data storage device 300/600 may include a "push" operation that is performed in response to the RAID storage controller device 204 transmitting an instruction to each of the RAID data storage devices 206, 208, 210, and 212 that causes the RAID data storage engine 304 in those RAID data storage devices 206, 208, 210, and 212 to write their respective primary data 206a, 208a, 210a, and 212a to the second buffer subsystem 308b in the RAID data storage device 300/600 (e.g., a CMB subsystem in the RAID data storage device 600.)

Figure 9B:
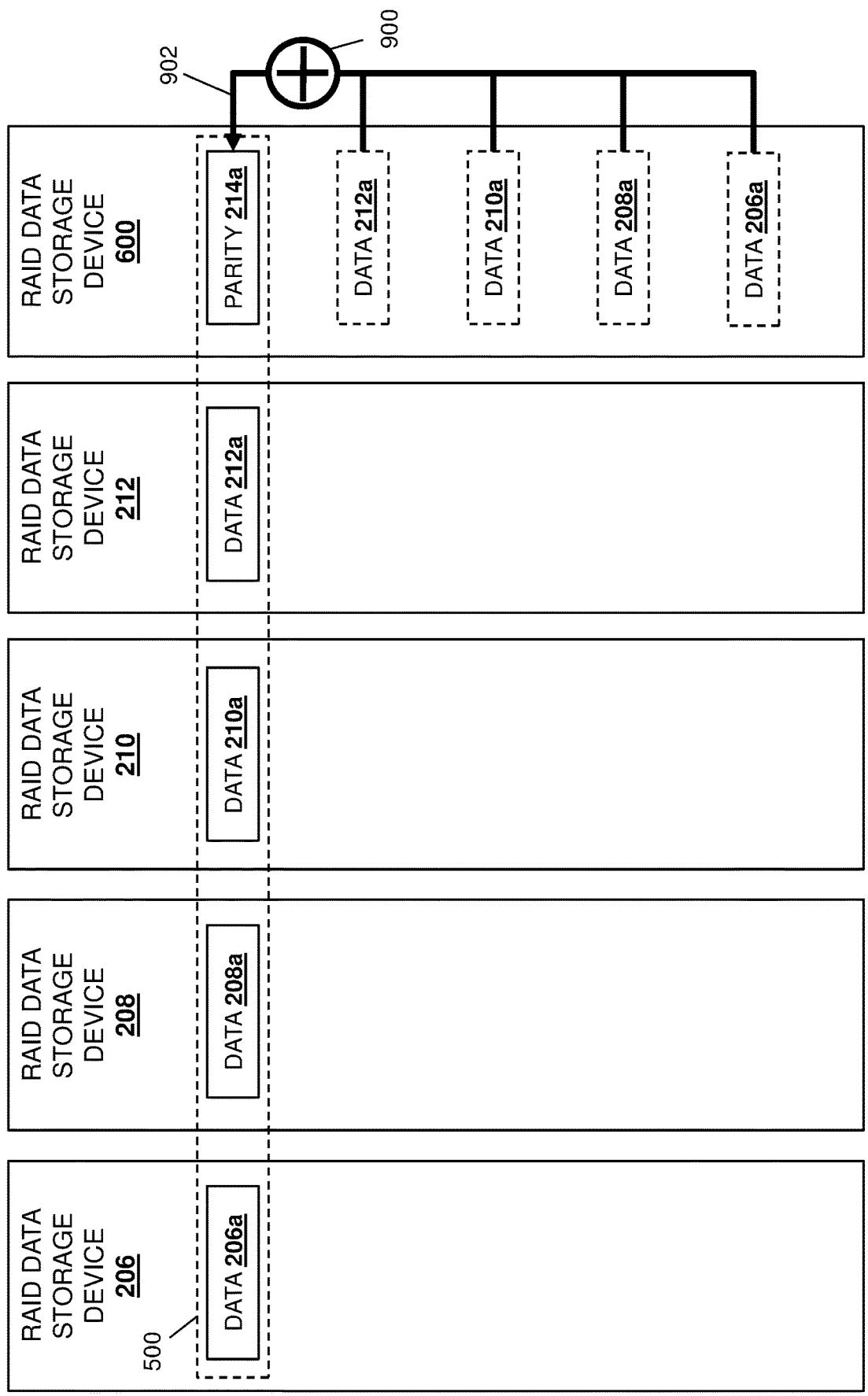
FIG. 9B is a schematic view illustrating an embodiment of the RAID data storage system of FIG. 2 operating during the method of FIGS. 4A and 4B.

The method 400 then proceeds to block 408 where the replacement RAID data storage device performs an XOR operation on the respective data to generate rebuilt data for the data stripe. With reference to FIG. 9B, in an embodiment of block 408, the RAID data storage engine 304 in the RAID data storage device 300/600 may operate to perform an XOR operation 900 on the primary data 206a, 208a, 210a, and 212a in order to generate the parity data 214a, which may be considered the "rebuilt data" discussed above (e.g., because it was rebuilt following its unavailability from the primary data 206a, 208a, 210a, and 212a.) As will be appreciated by one of skill in the art in possession of the present disclosure, the XOR operation 900 performed at block 408 may generate the rebuilt parity data 214a and initially store the rebuilt parity data 214a in the second buffer subsystem 308b in the RAID data storage device 600 (e.g., the CMB subsystem in the RAID data storage device 600.)

The method 400 then proceeds to block 410 where the replacement RAID data storage device stores the rebuilt data as part of the data stripe. In an embodiment, at block 410, the RAID data storage engine 304 in the RAID data storage device 300/600 may operate to perform write operations 902 to write the rebuilt parity data 214a from the second buffer subsystem 308b in the RAID data storage device 300/600 (e.g., the CMB subsystem in the RAID data storage device 600) to the storage subsystem 306 in the RAID data storage device 300/600 (e.g., a flash storage subsystem in the RAID data storage device 600) such that the rebuilt parity data 214a is stored as part of the first data stripe 500, as illustrated in FIG. 9B. As such, while FIG. 9B illustrates the write operation 902 being performed from the XOR operation 900 to store the rebuilt parity data 214a as part of the first data stripe 500, one of skill in the art in possession of the present disclosure will appreciate that FIG. 9B does not explicitly illustrate some of the intermediate storage operations that may be performed at blocks 408 and 410 (e.g., the writing of the result of the XOR operation to the second buffer subsystem 308b, followed by the writing of that result to the storage subsystem 306 such that it is included as part of the first data stripe.)

The method 400 then proceeds to decision block 412 where the method 400 proceeds depending on whether additional data stripes need rebuilt data. As discussed below, the data rebuild operations of the present disclosure may be performed for each data stripe that is stored in the RAID data storage system 200 and that includes data that was stored on the RAID data storage device 214 and that must be rebuilt and stored on the RAID data storage device 600. Thus, the method 400 will proceed based on whether there are any remaining data stripes stored in the RAID data storage system 200 for which data must be rebuilt for storage on the RAID data storage device 600.

If, at decision block 412, additional data stripes need rebuilt data, the method 400 proceeds to decision block 414 where the method 400 proceeds depending on whether there is an existing RAID data storage device that qualifies to rebuild data. As discussed below, the data rebuild operations of the present disclosure may be distributed amongst the RAID data storage devices included in the RAID data storage system 200, with the example below providing a substantially equal distribution of the performance of data rebuild operations between the RAID data storage devices 206, 208, 210, 212, and 600. However, while the performance of the data rebuild operations is described below as being substantially equal distributed amongst the RAID data storage devices 206, 208, 210, 212, and 600 in the RAID data storage system 200, one of skill in the art in possession of the present disclosure will recognize that the teachings of the present disclosure may provide an unequal distribution of the performance of data rebuild operations between the RAID data storage devices 206, 208, 210, 212, and 600. For example, the data rebuild operations discussed below may be distributed amongst the RAID data storage devices in the RAID data storage system 200 based on processing capabilities (e.g., RAID data storage devices with relatively higher processing capabilities may perform data rebuild operations for more data stripes than RAID data storage devices with relatively higher processing capabilities), data transfer bandwidth (RAID data storage devices with relatively higher data transfer bandwidth may perform data rebuild operations for more data stripes than RAID data storage devices with relatively lower data transfer bandwidth), and/or based on any other relative RAID data storage device capability that would be apparent to one of skill in the art in possession of the present disclosure.

As such, the method 400 may provide for the selection of particular RAID data storage devices for performing data rebuild operations for any particular data stripes, and thus any iteration of the method 400 may operate to select one of the RAID data storage devices 206-212 ("existing" RAID data storage devices) to act as a "proxy" for performing data rebuild operations for the data in the data stripe that is being rebuilt for the replacement RAID data storage device 600 during that iteration of the method 400. Thus, the method 400 will proceed based on whether any of the RAID data storage devices 206-212 qualifies to rebuild the data in the data stripe that is being rebuilt during that iteration of the method 400.

Figure 10A:
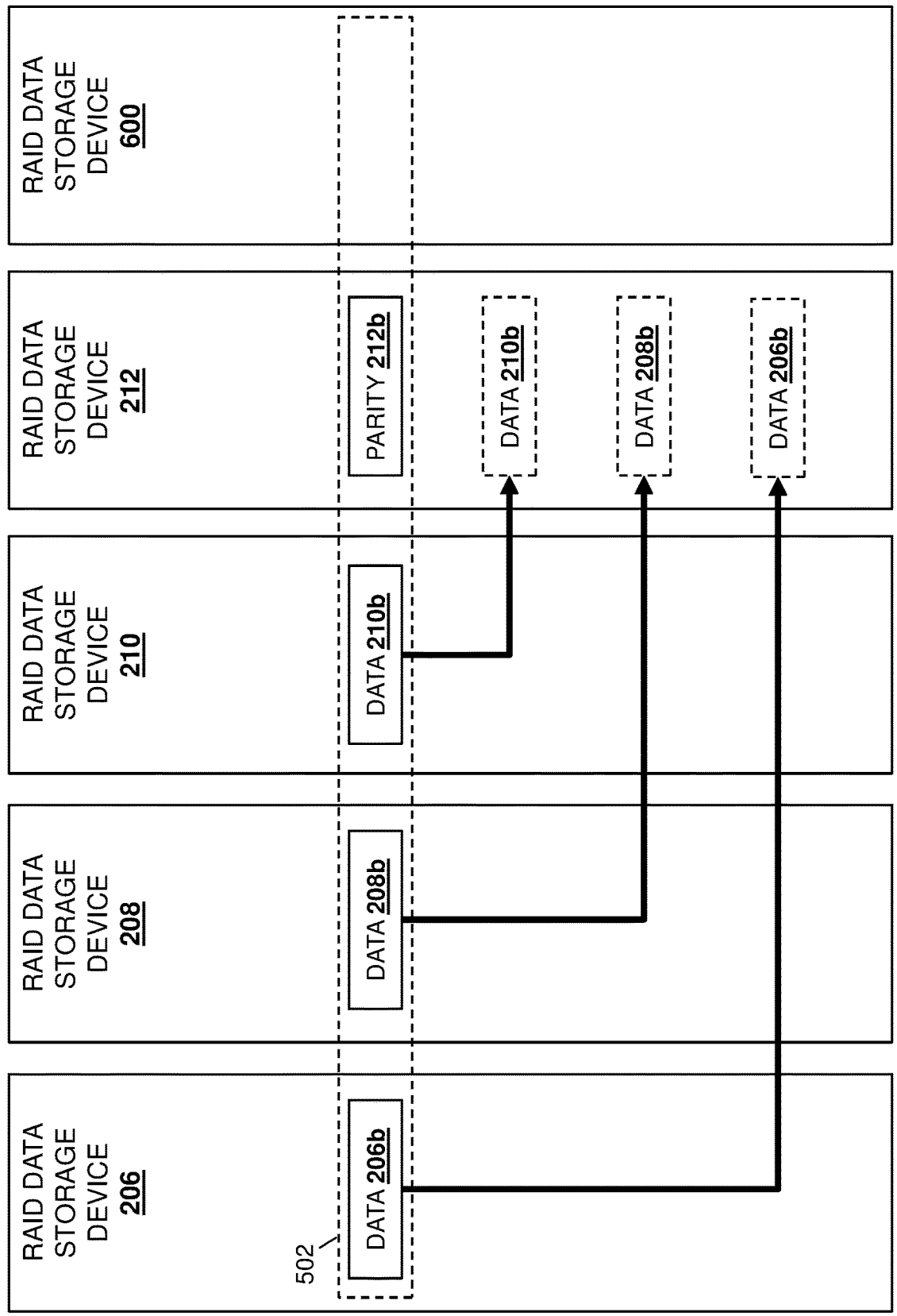
FIG. 10A is a schematic view illustrating an embodiment of the RAID data storage system of FIG. 2 operating during the method of FIGS. 4A and 4B.

If at decision block 414, there is an existing RAID data storage device that qualifies to rebuild data, the method 400 proceeds to block 416 where that existing RAID data storage device retrieves respective first data for a data stripe from the other existing RAID data storage devices. In this example, the second data stripe 502 needs rebuilt data at decision block 412, and the RAID data storage device 212 qualifies to rebuild the data for the second data stripe 502 at decision block 414. With reference to FIG. 10A, in an embodiment of this (first) iteration of block 416, the RAID data storage engine 304 in the RAID data storage device 300/212 may operate to retrieve/receive the primary data 206b stored in the RAID data storage device 206 for the second data stripe 502, the primary data 208b stored in the RAID data storage device 208 for the second data stripe 500, and the primary data 210b stored in the RAID data storage device 210 for the second data stripe 500. In one embodiment, at block 416, the RAID data storage engine 304 in the RAID data storage device 300/212 may perform a "read peers" RAID operation in order to read the primary data 206b, 208b, and 210b from the RAID data storage devices 206, 208, and 210, respectively.

For example, the "read peers" RAID operation performed by the RAID data storage engine 304 in the RAID data storage device 300/212 may include a "pull" operation that is performed in response to the RAID storage controller device 300/212 transmitting an instruction to each of the RAID data storage devices 206, 208, and 210 that causes the RAID data storage engine 304 in those RAID data storage devices 206, 208, and 210 to write their respective primary data 206b, 208b, and 210b to their respective second buffer subsystems 308b (e.g., their respective CMB subsystems.) Subsequently, the RAID data storage engine 304 in the RAID data storage device 300/212 may perform respective read operations to read the respective primary data 206b, 208b, and 210b from the respective second buffer subsystems 308b in the RAID data storage devices 206, 208, and 210 respectively, and then store the primary data 206b, 208b, and 210b in its second buffer subsystem 308b (e.g., a CMB subsystem in the RAID data storage device 212.)

In another example, the "read peers" RAID operation performed by the RAID data storage engine 304 in the RAID data storage device 300/212 may include a "push" operation that is performed in response to the RAID storage controller device 204 transmitting an instruction to each of the RAID data storage devices 206, 208, and 210 that causes the RAID data storage engine 304 in those RAID data storage devices 206, 208, and 210 to write their respective primary data 206b, 208b, and 210b to the second buffer subsystem 308b in the RAID data storage device 300/212 (e.g., a CMB subsystem in the RAID data storage device 212.)

Figure 10B:
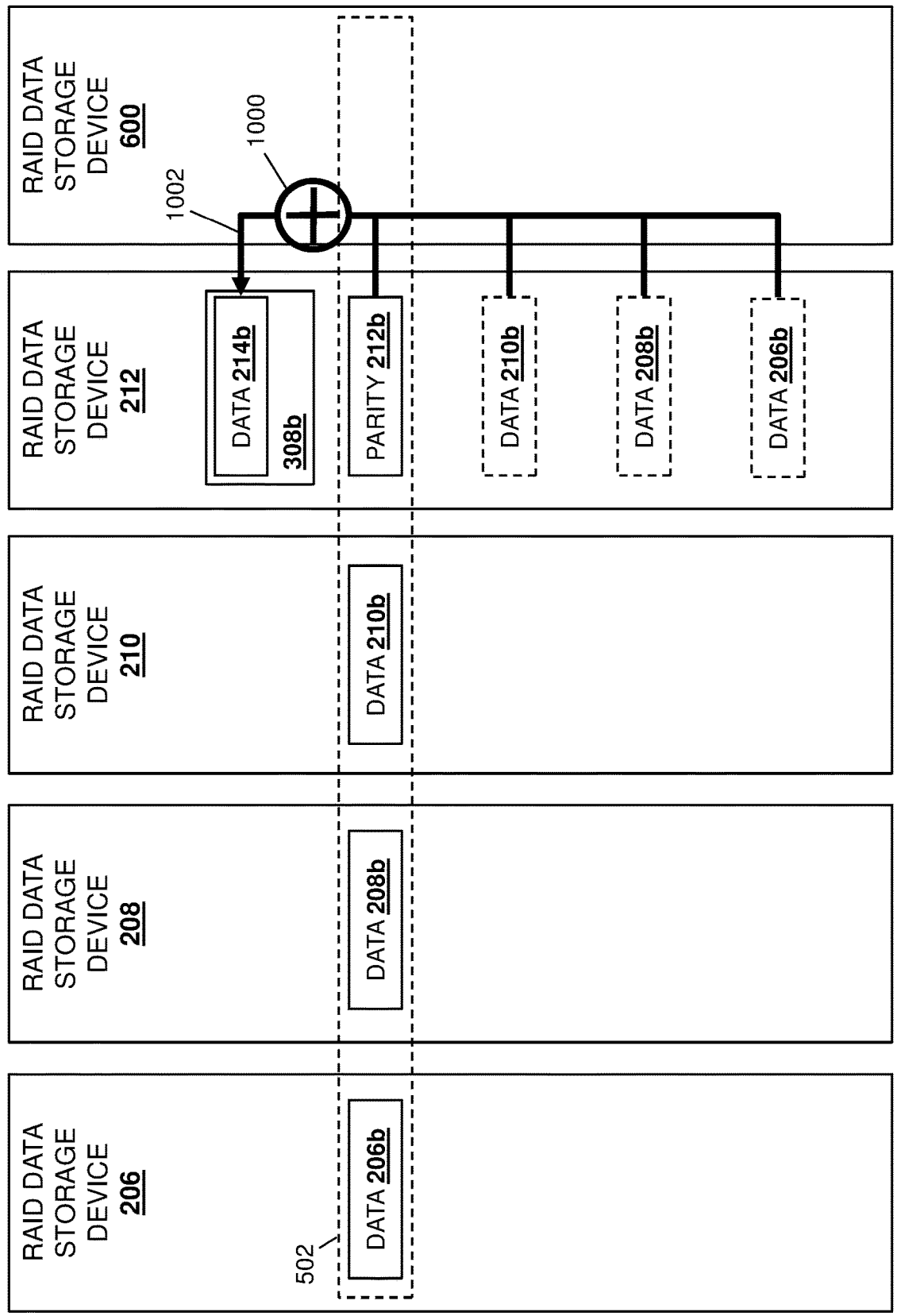
FIG. 10B is a schematic view illustrating an embodiment of the RAID data storage system of FIG. 2 operating during the method of FIGS. 4A and 4B.

The method 400 then proceeds to block 418 where the existing RAID data storage device performs an XOR operation on the respective first data, along with second data for the data stripe that is stored in that existing RAID data storage device, in order to generate rebuilt data for the data stripe. With reference to FIG. 10B, in an embodiment of block 418, the RAID data storage engine 304 in the RAID data storage device 300/212 may operate to perform an XOR operation 1000 on the primary data 206b, 208b, and 210b, along with the parity data 212b that was previously stored in the RAID data storage device 212, in order to generate the primary data 214b, which may be considered the "rebuilt data" discussed above (e.g., because it was rebuilt following its unavailability from the primary data 206b, 208b, and 210b, along with the parity data 212b.) As will be appreciated by one of skill in the art in possession of the present disclosure, the XOR operation 1000 performed at block 418 may generate the rebuilt primary data 214b and store the rebuilt primary data 214b in the second buffer subsystem 308b in the RAID data storage device 212 (e.g., the CMB subsystem in the RAID data storage device 212.)

The method 400 then proceeds to block 420 where the existing RAID data storage device provides the rebuilt data to the replacement storage device for storage as part of the data stripe. In an embodiment, at block 420, the RAID data storage engine 304 in the RAID data storage device 300/212 may inform the RAID data storage device 600 that the rebuilt primary data 214b is stored in its second buffer subsystem 308b. As illustrated in FIG. 10O, in response to being informed that the rebuilt primary data 214b is stored in the second buffer subsystem 308b in the RAID data storage device 300/212, the RAID data storage engine 304 in the RAID data storage device 300/600 may retrieve the rebuilt primary data 214b and store that rebuilt primary data 214b as part of the second data stripe 502. For example, at block 420, the RAID data storage engine 304 in the RAID data storage device 300/600 may perform a Direct Memory Access (DMA) operation that writes the rebuilt primary data 214b from the second buffer subsystem 308b in the RAID data storage device 300/212 to the storage subsystem 306 in the RAID data storage device 300/600 (e.g., the RAID data storage device 300/212 may write the rebuilt primary data 214 to its CMB subsystem 308b, and then notify the RAID data storage device 300/600 of that rebuilt primary data so that the RAID data storage device 300/600 may write that rebuilt primary data to some Logical Block Addressing (LBA) range).

The method then returns to decision block 412. As will be appreciated by one of skill in the art in possession of the present disclosure, as long as additional data stripes need rebuilt data at decision block 412, and an existing RAID data storage device qualifies to rebuild data at block 414, the method 400 may loop such that an existing RAID data storage device performs the data rebuild operations according to blocks 416 and 418, and the replacement RAID data storage device performs the data retrieval operations at block 420, to rebuild data on the replacement RAID data storage device.

Figure 11A:
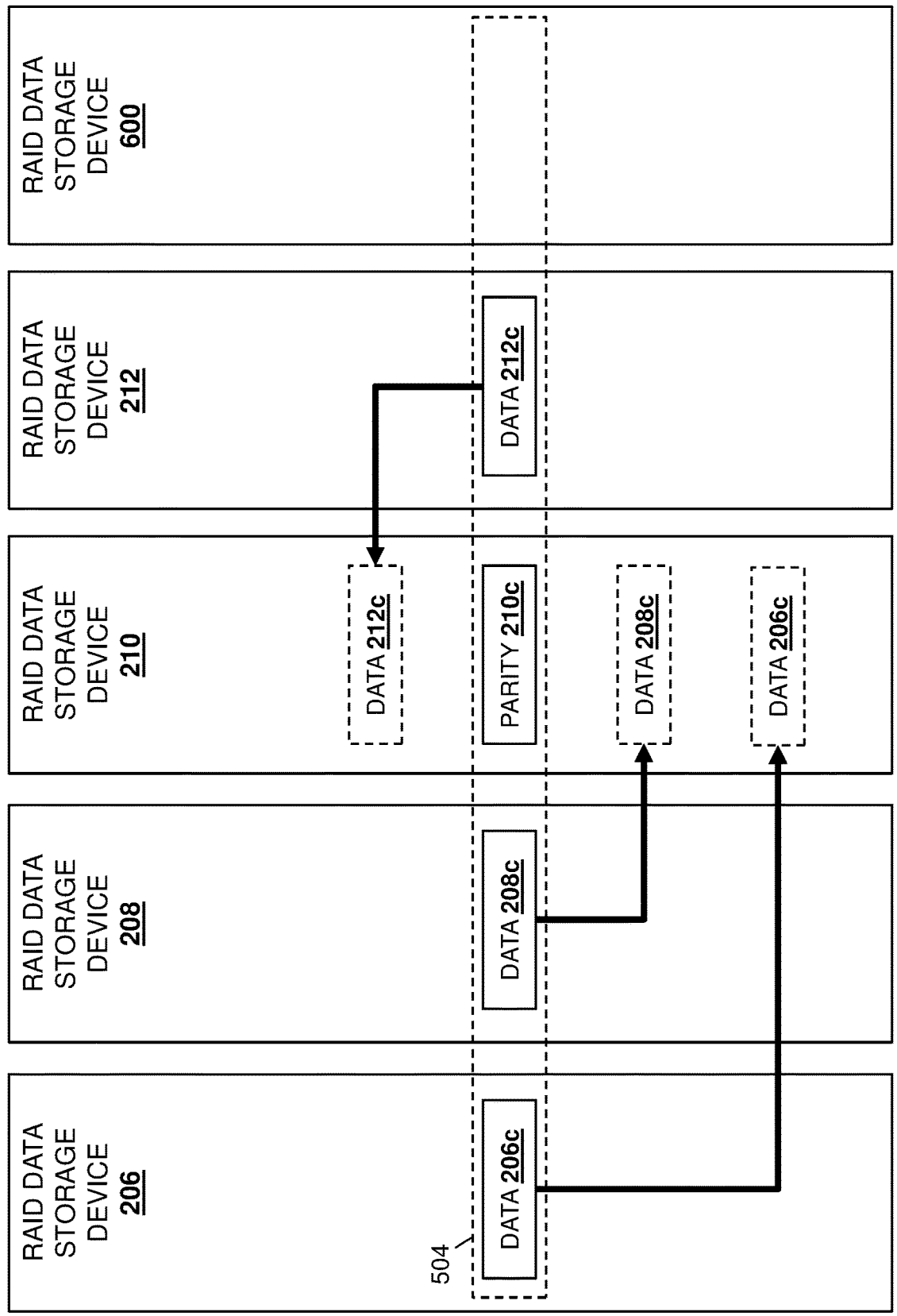
FIG. 11A is a schematic view illustrating an embodiment of the RAID data storage system of FIG. 2 operating during the method of FIGS. 4A and 4B.

Continuing with the example above, it will be determined that the third data stripe 504 needs rebuilt data at the second iteration of decision block 412, and the RAID data storage device 210 will qualify to rebuild the data for the third data stripe 504 at the second iteration of block 414. With reference to FIG. 11A, in an embodiment of the second iteration of block 416, the RAID data storage engine 304 in the RAID data storage device 300/210 may operate to retrieve/receive the primary data 206c stored in the RAID data storage device 206 for the third data stripe 504, the primary data 208c stored in the RAID data storage device 208 for the third data stripe 504, and the primary data 212c stored in the RAID data storage device 212 for the third data stripe 504. In one embodiment, at the second iteration of block 416, the RAID data storage engine 304 in the RAID data storage device 300/210 may perform a "read peers" RAID operation in order to read the primary data 206c, 208c, and 212c from the RAID data storage devices 206, 208, and 212, respectively.

For example, the "read peers" RAID operation performed by the RAID data storage engine 304 in the RAID data storage device 300/210 may include a "pull" operation that is performed in response to the RAID storage controller device 204 transmitting an instruction to each of the RAID data storage devices 206, 208, and 212 that causes the RAID data storage engine 304 in those RAID data storage devices 206, 208, and 212 to write their respective primary data 206c, 208c, and 212c to their respective second buffer subsystems 308b (e.g., their respective CMB subsystems.) Subsequently, the RAID data storage engine 304 in the RAID data storage device 300/210 may perform respective read operations to read the respective primary data 206c, 208c, and 212c from the respective second buffer subsystems 308b in the RAID data storage devices 206, 208, and 212 respectively, and then store the primary data 206c, 208c, and 212c in its second buffer subsystem 308b (e.g., a CMB subsystem in the RAID data storage device 210.)

In another example, the "read peers" RAID operation performed by the RAID data storage engine 304 in the RAID data storage device 300/210 may include a "push" operation that is performed in response to the RAID storage controller device 204 transmitting an instruction to each of the RAID data storage devices 206, 208, and 212 that causes the RAID data storage engine 304 in those RAID data storage devices 206, 208, and 212 to write their respective primary data 206c, 208c, and 212c to the second buffer subsystem 308b in the RAID data storage device 300/210 (e.g., a CMB subsystem in the RAID data storage device 210.)

Figure 11B:
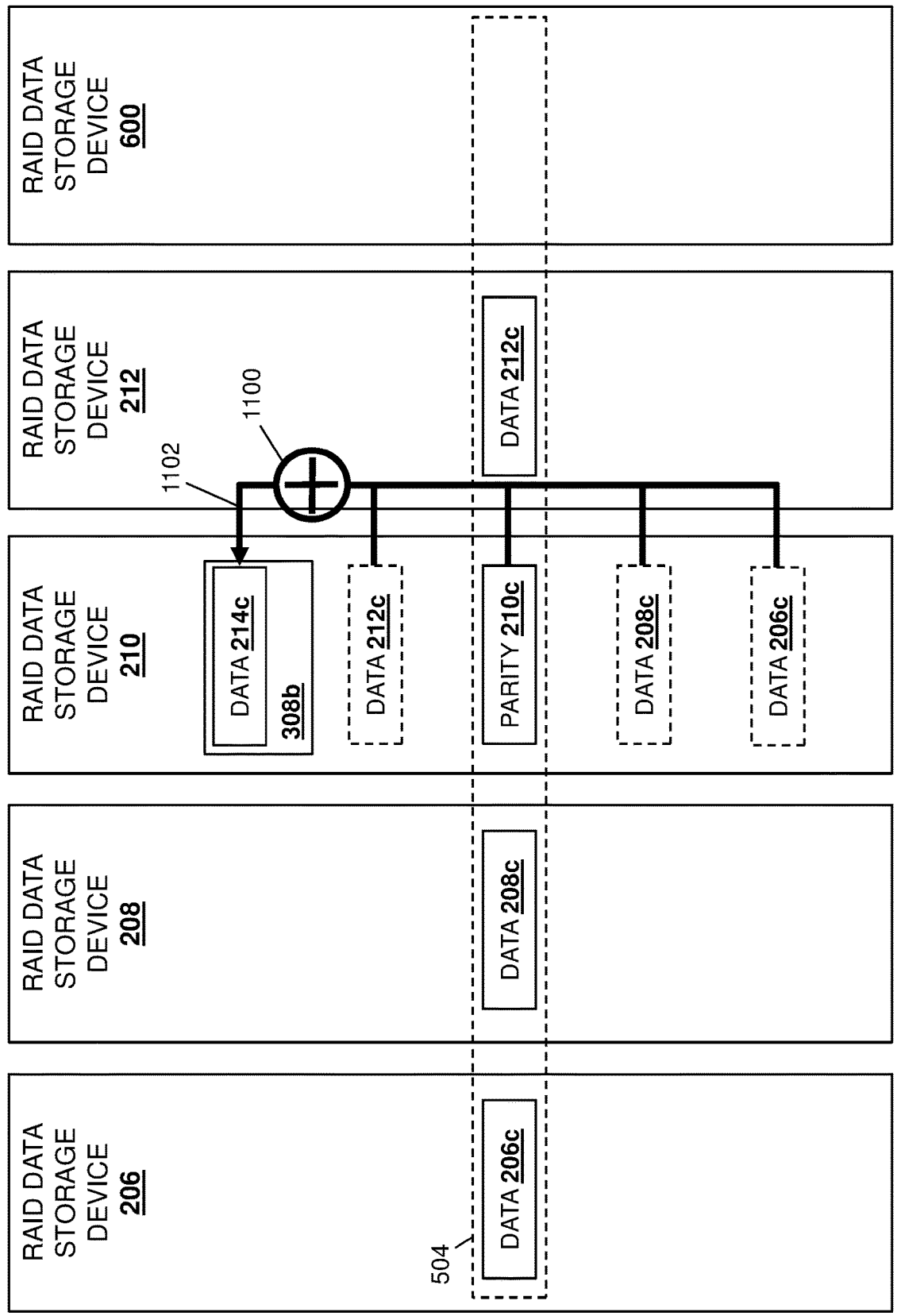
FIG. 11B is a schematic view illustrating an embodiment of the RAID data storage system of FIG. 2 operating during the method of FIGS. 4A and 4B.

The method 400 then proceeds to the second iteration of block 418 where the existing RAID data storage device performs an XOR operation on the respective first data, along with second data for the data stripe that is stored in that existing RAID data storage device, in order to generate rebuilt data for the data stripe. With reference to FIG. 11B, in an embodiment of block 418, the RAID data storage engine 304 in the RAID data storage device 300/210 may operate to perform an XOR operation 1100 on the primary data 206c, 208c, and 212c, along with the parity data 210c that was previously stored in the RAID data storage device 210, in order to generate the primary data 214c, which may be considered the "rebuilt data" discussed above (e.g., because it was rebuilt following its unavailability from the primary data 206c, 208c, and 212c, along with the parity data 210c.) As will be appreciated by one of skill in the art in possession of the present disclosure, the XOR operation 1100 performed at block 418 may generate the rebuilt primary data 214c and store the rebuilt primary data 214c in the second buffer subsystem 308b in the RAID data storage device 210 (e.g., the CMB subsystem in the RAID data storage device 210.)

Figure 11C:
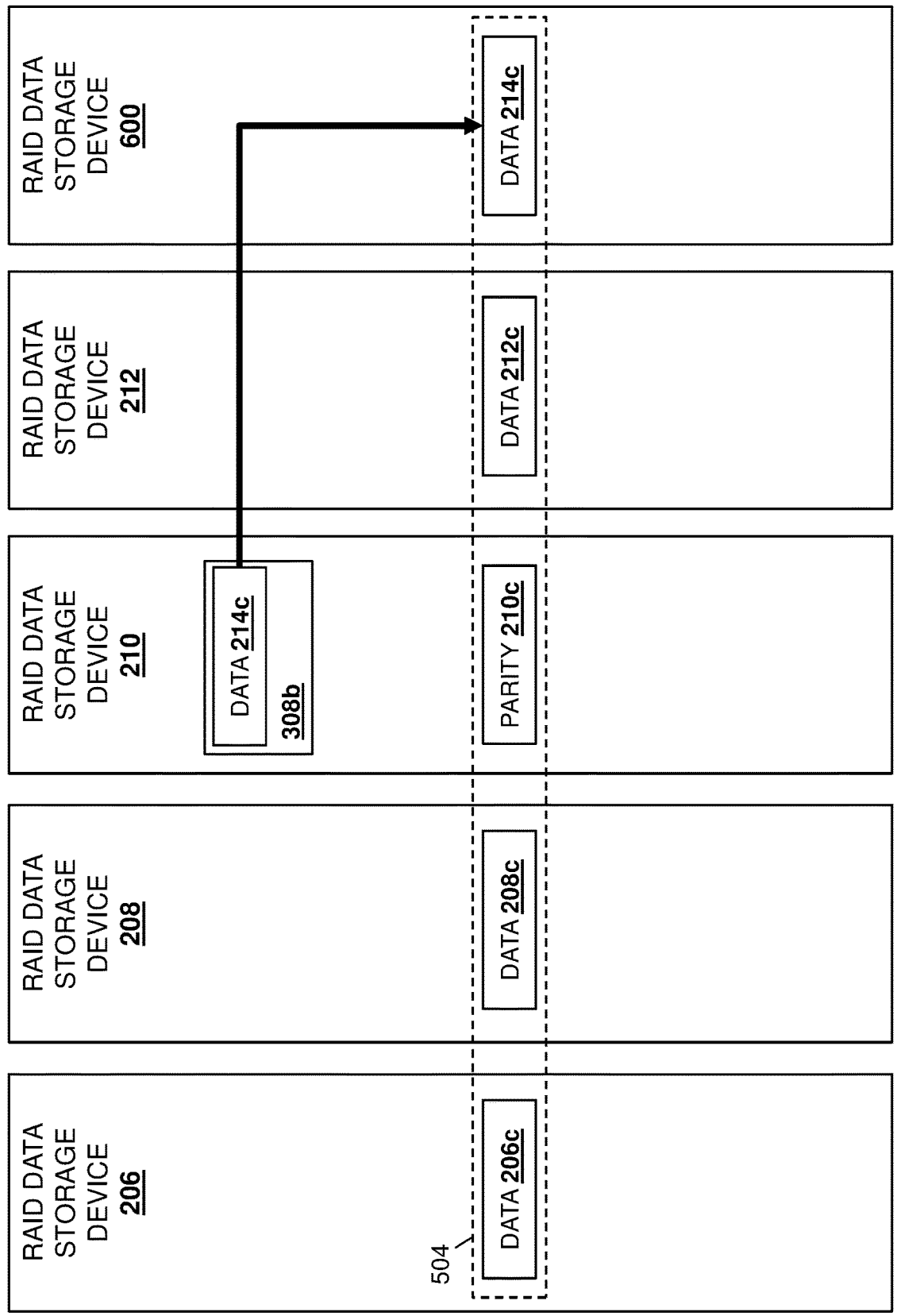
FIG. 11C is a schematic view illustrating an embodiment of the RAID data storage system of FIG. 2 operating during the method of FIGS. 4A and 4B.

The method 400 then proceeds to the second iteration of block 420 where the existing RAID data storage device provides the rebuilt data to the replacement storage device for storage as part of the data stripe. In an embodiment, at block 420, the RAID data storage engine 304 in the RAID data storage device 300/210 may inform the RAID data storage device 600 that the rebuilt primary data 214c is stored in its second buffer subsystem 308b. As illustrated in FIG. 11C, in response to being informed that the rebuilt primary data 214c is stored in the second buffer subsystem 308b in the RAID data storage device 300/210, the RAID data storage engine 304 in the RAID data storage device 300/600 may retrieve the rebuilt primary data 214c and store that rebuilt primary data 214c as part of the third data stripe 504. For example, at block 420, the RAID data storage engine 304 in the RAID data storage device 300/600 may perform a Direct Memory Access (DMA) operation that writes the rebuilt primary data 214c from the second buffer subsystem 308b in the RAID data storage device 300/210 to the storage subsystem 306 in the RAID data storage device 300/600.

The method then returns to the third iteration of decision block 412. As discussed above, as long as additional data stripes need rebuilt data at decision block 412, and an existing RAID data storage device qualifies to rebuild data at block 414, the method 400 may loop such that an existing RAID data storage device performs the data rebuild operations according to blocks 416 and 418, and the replacement RAID data storage device performs the data retrieval operations at block 420, to rebuild data on the replacement RAID data storage device.

Figure 12A:
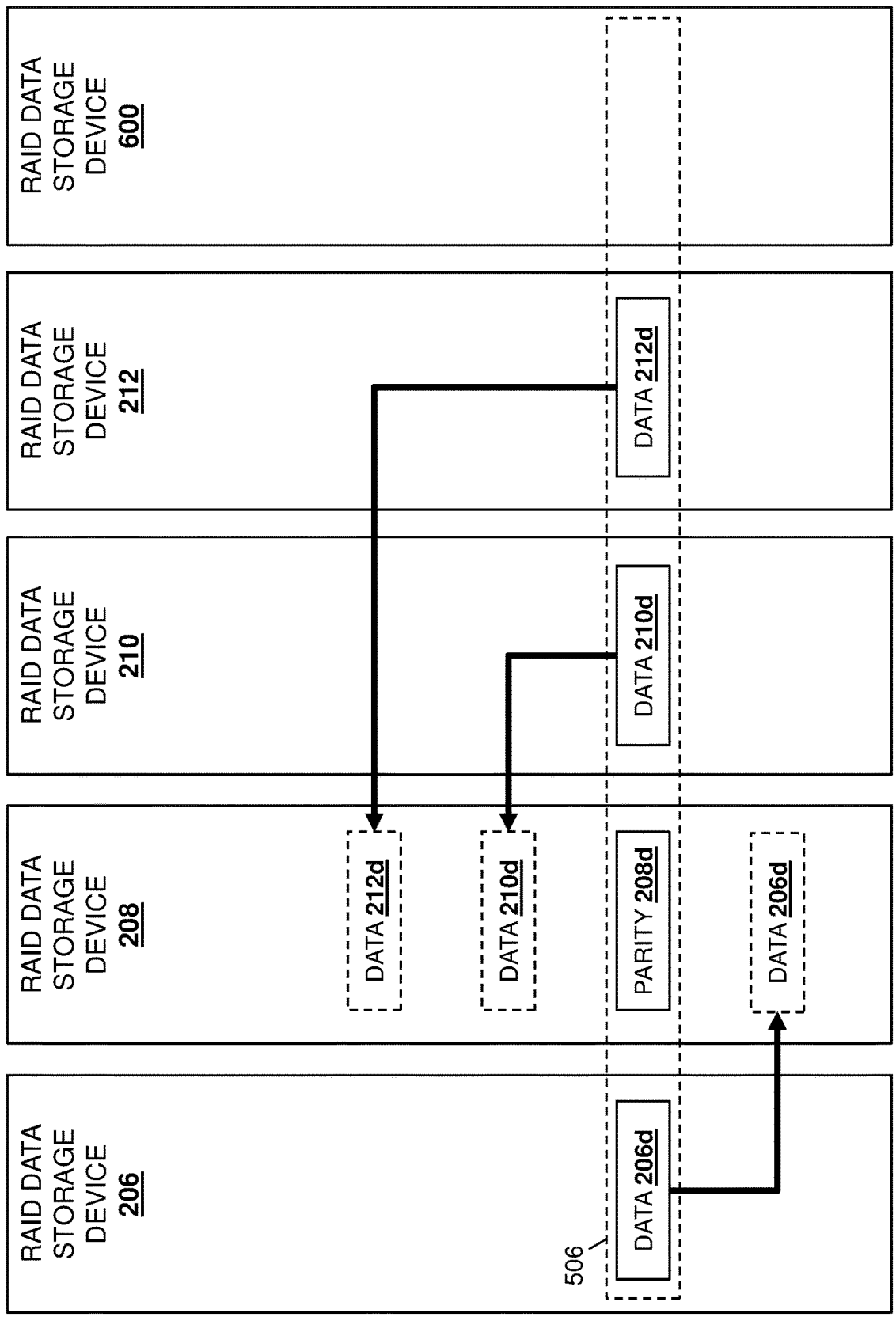
FIG. 12A is a schematic view illustrating an embodiment of the RAID data storage system of FIG. 2 operating during the method of FIGS. 4A and 4B.

Continuing with the example above, it will be determined that the fourth data stripe 506 needs rebuilt data at the third iteration of decision block 412, and the RAID data storage device 208 will qualify to rebuild the data for the fourth data stripe 506 at the third iteration of block 414. With reference to FIG. 12A, in an embodiment of the third iteration of block 416, the RAID data storage engine 304 in the RAID data storage device 300/208 may operate to retrieve/receive the primary data 206d stored in the RAID data storage device 206 for the fourth data stripe 506, the primary data 210d stored in the RAID data storage device 210 for the fourth data stripe 506, and the primary data 212d stored in the RAID data storage device 212 for the fourth data stripe 506. In one embodiment, at the third iteration of block 416, the RAID data storage engine 304 in the RAID data storage device 300/208 may perform a "read peers" RAID operation in order to read the primary data 206d, 210d, and 212d from the RAID data storage devices 206, 210, and 212, respectively.

For example, the "read peers" RAID operation performed by the RAID data storage engine 304 in the RAID data storage device 300/208 may include a "pull" operation that is performed in response to the RAID storage controller device 204 transmitting an instruction to each of the RAID data storage devices 206, 210, and 212 that causes the RAID data storage engine 304 in those RAID data storage devices 206, 210, and 212 to write their respective primary data 206d, 210d, and 212d to their respective second buffer subsystems 308b (e.g., their respective CMB subsystems.) Subsequently, the RAID data storage engine 304 in the RAID data storage device 300/208 may perform respective read operations to read the respective primary data 206d, 210d, and 212d from the respective second buffer subsystems 308b in the RAID data storage devices 206, 210, and 212 respectively, and then store the primary data 206d, 210d, and 212d in its second buffer subsystem 308b (e.g., a CMB subsystem in the RAID data storage device 208.)

In another example, the "read peers" RAID operation performed by the RAID data storage engine 304 in the RAID data storage device 300/208 may include a "push" operation that is performed in response to the RAID storage controller device 204 transmitting an instruction to each of the RAID data storage devices 206, 210, and 212 that causes the RAID data storage engine 304 in those RAID data storage devices 206, 210, and 212 to write their respective primary data 206d, 210d, and 212d to the second buffer subsystem 308b in the RAID data storage device 300/208 (e.g., a CMB subsystem in the RAID data storage device 208.)

Figure 12B:
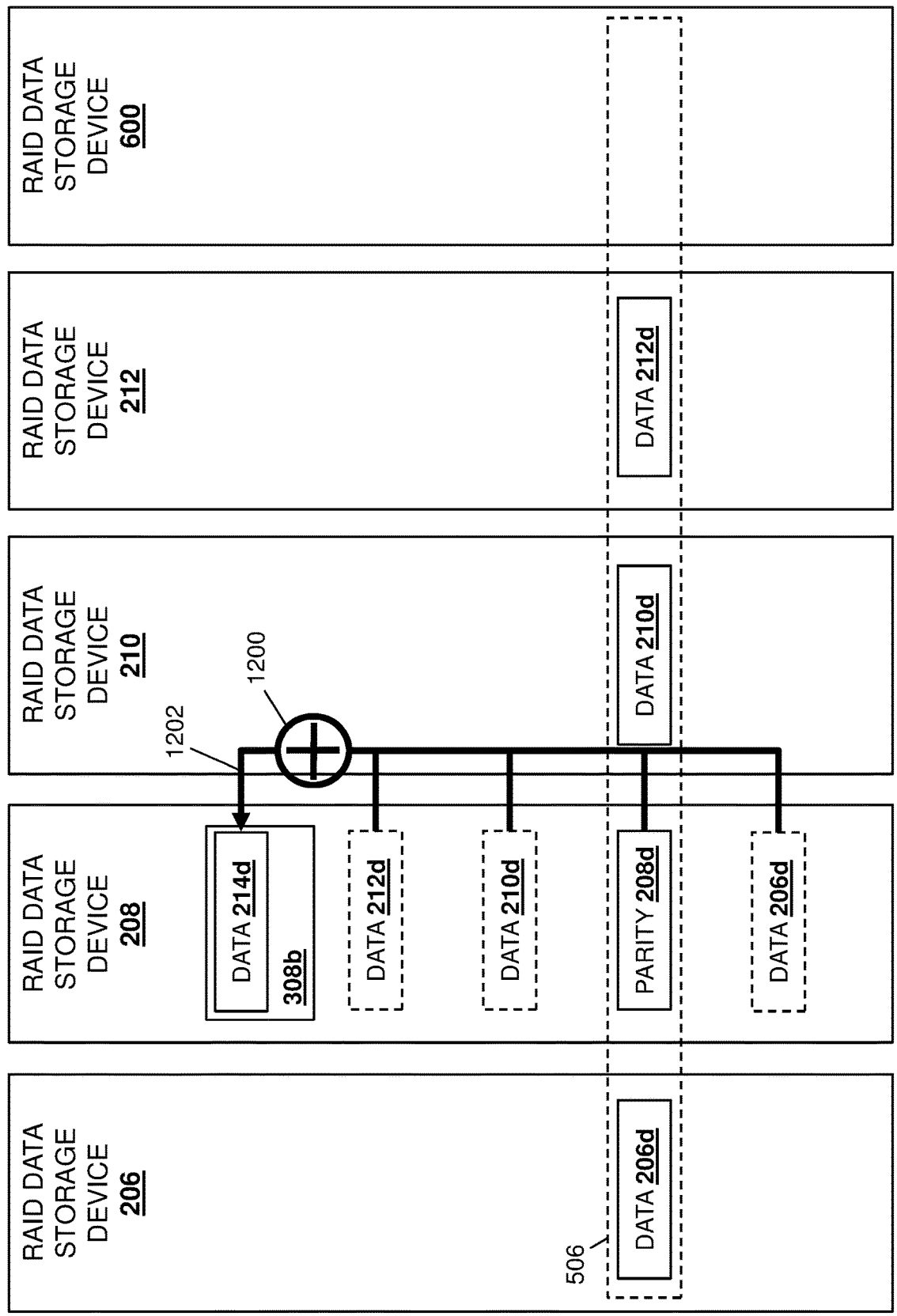
FIG. 12B is a schematic view illustrating an embodiment of the RAID data storage system of FIG. 2 operating during the method of FIGS. 4A and 4B.

The method 400 then proceeds to the third iteration of block 418 where the existing RAID data storage device performs an XOR operation on the respective first data, along with second data for the data stripe that is stored in that existing RAID data storage device, in order to generate rebuilt data for the data stripe. With reference to FIG. 12B, in an embodiment of block 418, the RAID data storage engine 304 in the RAID data storage device 300/208 may operate to perform an XOR operation 1200 on the primary data 206d, 210d, and 212d, along with the parity data 208d that was previously stored in the RAID data storage device 208, in order to generate the primary data 214d, which may be considered the "rebuilt data" discussed above (e.g., because it was rebuilt following its unavailability from the primary data 206d, 210d, and 212d, along with the parity data 208d.) As will be appreciated by one of skill in the art in possession of the present disclosure, the XOR operation 1200 performed at block 418 may generate the rebuilt primary data 214d and store the rebuilt primary data 214d in the second buffer subsystem 308b in the RAID data storage device 208 (e.g., the CMB subsystem in the RAID data storage device 208.)

Figure 12C:
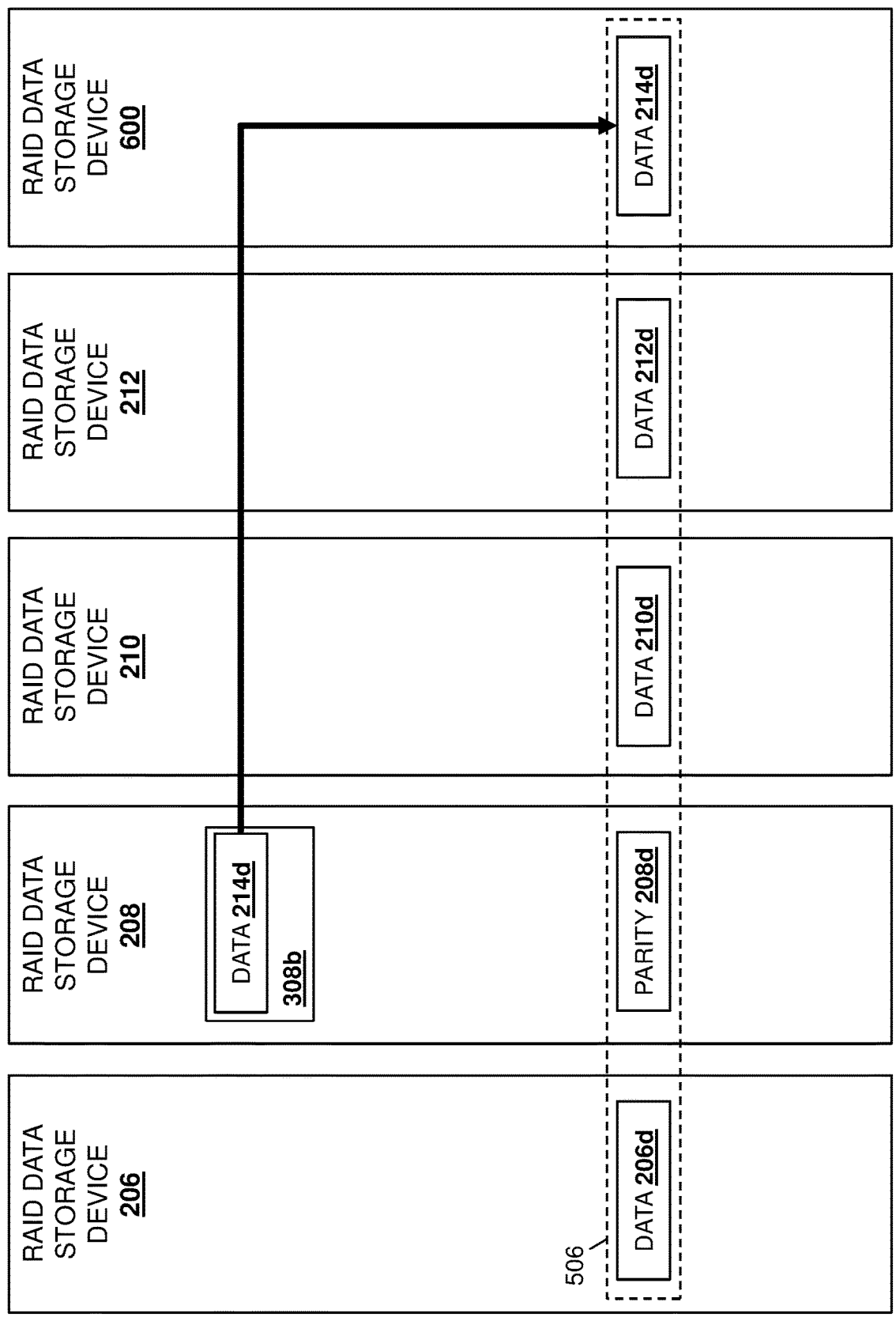
FIG. 12C is a schematic view illustrating an embodiment of the RAID data storage system of FIG. 2 operating during the method of FIGS. 4A and 4B.

The method 400 then proceeds to the third iteration of block 420 where the existing RAID data storage device provides the rebuilt data to the replacement storage device for storage as part of the data stripe. In an embodiment, at block 420, the RAID data storage engine 304 in the RAID data storage device 300/208 may inform the RAID data storage device 600 that the rebuilt primary data 214d is stored in its second buffer subsystem 308b. As illustrated in FIG. 12C, in response to being informed that the rebuilt primary data 214d is stored in the second buffer subsystem 308b in the RAID data storage device 300/208, the RAID data storage engine 304 in the RAID data storage device 300/600 may retrieve the rebuilt primary data 214d and store that rebuilt primary data 214d as part of the fourth data stripe 506. For example, at block 420, the RAID data storage engine 304 in the RAID data storage device 300/600 may perform a Direct Memory Access (DMA) operation that writes the rebuilt primary data 214d from the second buffer subsystem 308b in the RAID data storage device 300/208 to the storage subsystem 306 in the RAID data storage device 300/600.

The method then returns to the fourth iteration of decision block 412. As discussed above, as long as additional data stripes need rebuilt data at decision block 412, and an existing RAID data storage device qualifies to rebuild data at block 414, the method 400 may loop such that an existing RAID data storage device performs the data rebuild operations according to blocks 416 and 418, and the replacement RAID data storage device performs the data retrieval operations at block 420, to rebuild data on the replacement RAID data storage device.

Continuing with the example above, it will be determined that the fifth data stripe 508 needs rebuilt data at the fourth iteration of decision block 412, and the RAID data storage device 206 will qualify to rebuild the data for the fifth data stripe 508 at the fourth iteration of block 414. With reference to FIG. 13A, in an embodiment of the fourth iteration of block 416, the RAID data storage engine 304 in the RAID data storage device 300/206 may operate to retrieve/receive the primary data 208e stored in the RAID data storage device 208 for the fifth data stripe 508, the primary data 210e stored in the RAID data storage device 210 for the fifth data stripe 508, and the primary data 212e stored in the RAID data storage device 212 for the fifth data stripe 508. In one embodiment, at the fourth iteration of block 416, the RAID data storage engine 304 in the RAID data storage device 300/206 may perform a "read peers" RAID operation in order to read the primary data 208e, 210e, and 212e from the RAID data storage devices 208, 210, and 212, respectively.

For example, the "read peers" RAID operation performed by the RAID data storage engine 304 in the RAID data storage device 300/206 may include a "pull" operation that is performed in response to the RAID storage controller device 204 transmitting an instruction to each of the RAID data storage devices 208, 210, and 212 that causes the RAID data storage engine 304 in those RAID data storage devices 208, 210, and 212 to write their respective primary data 208e, 210e, and 212e to their respective second buffer subsystems 308b (e.g., their respective CMB subsystems.) Subsequently, the RAID data storage engine 304 in the RAID data storage device 300/206 may perform respective read operations to read the respective primary data 208e, 210e, and 212e from the respective second buffer subsystems 308b in the RAID data storage devices 208, 210, and 212 respectively, and then store the primary data 208e, 210e, and 212e in its second buffer subsystem 308b (e.g., a CMB subsystem in the RAID data storage device 206.)

In another example, the "read peers" RAID operation performed by the RAID data storage engine 304 in the RAID data storage device 300/206 may include a "push" operation that is performed in response to the RAID storage controller device 204 transmitting an instruction to each of the RAID data storage devices 208, 210, and 212 that causes the RAID data storage engine 304 in those RAID data storage devices 208, 210, and 212 to write their respective primary data 208e, 210e, and 212e to the second buffer subsystem 308b in the RAID data storage device 300/206 (e.g., a CMB subsystem in the RAID data storage device 206.)

Figure 13B:
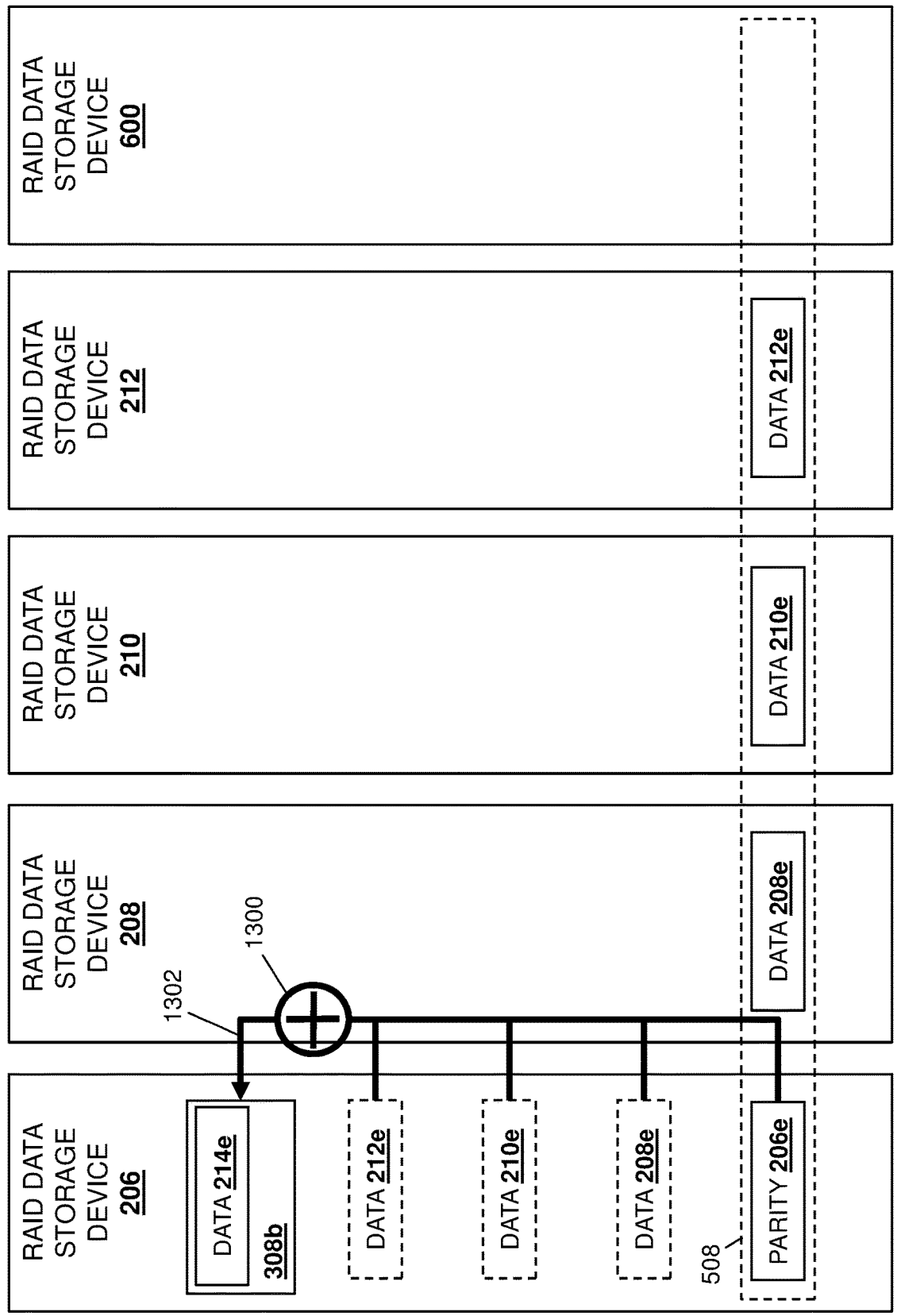
FIG. 13B is a schematic view illustrating an embodiment of the RAID data storage system of FIG. 2 operating during the method of FIGS. 4A and 4B.

The method 400 then proceeds to the fourth iteration of block 418 where the existing RAID data storage device performs an XOR operation on the respective first data, along with second data for the data stripe that is stored in that existing RAID data storage device, in order to generate rebuilt data for the data stripe. With reference to FIG. 13B, in an embodiment of block 418, the RAID data storage engine 304 in the RAID data storage device 300/206 may operate to perform an XOR operation 1300 on the primary data 208e, 210e, and 212e, along with the parity data 206e that was previously stored in the RAID data storage device 206, in order to generate the primary data 214e, which may be considered the "rebuilt data" discussed above (e.g., because it was rebuilt following its unavailability from the primary data 208e, 210e, and 212e, along with the parity data 206e.) As will be appreciated by one of skill in the art in possession of the present disclosure, the XOR operation 1300 performed at block 418 may generate the rebuilt primary data 214e and store the rebuilt primary data 214e in the second buffer subsystem 308b in the RAID data storage device 206 (e.g., the CMB subsystem in the RAID data storage device 206.)

Figure 13C:
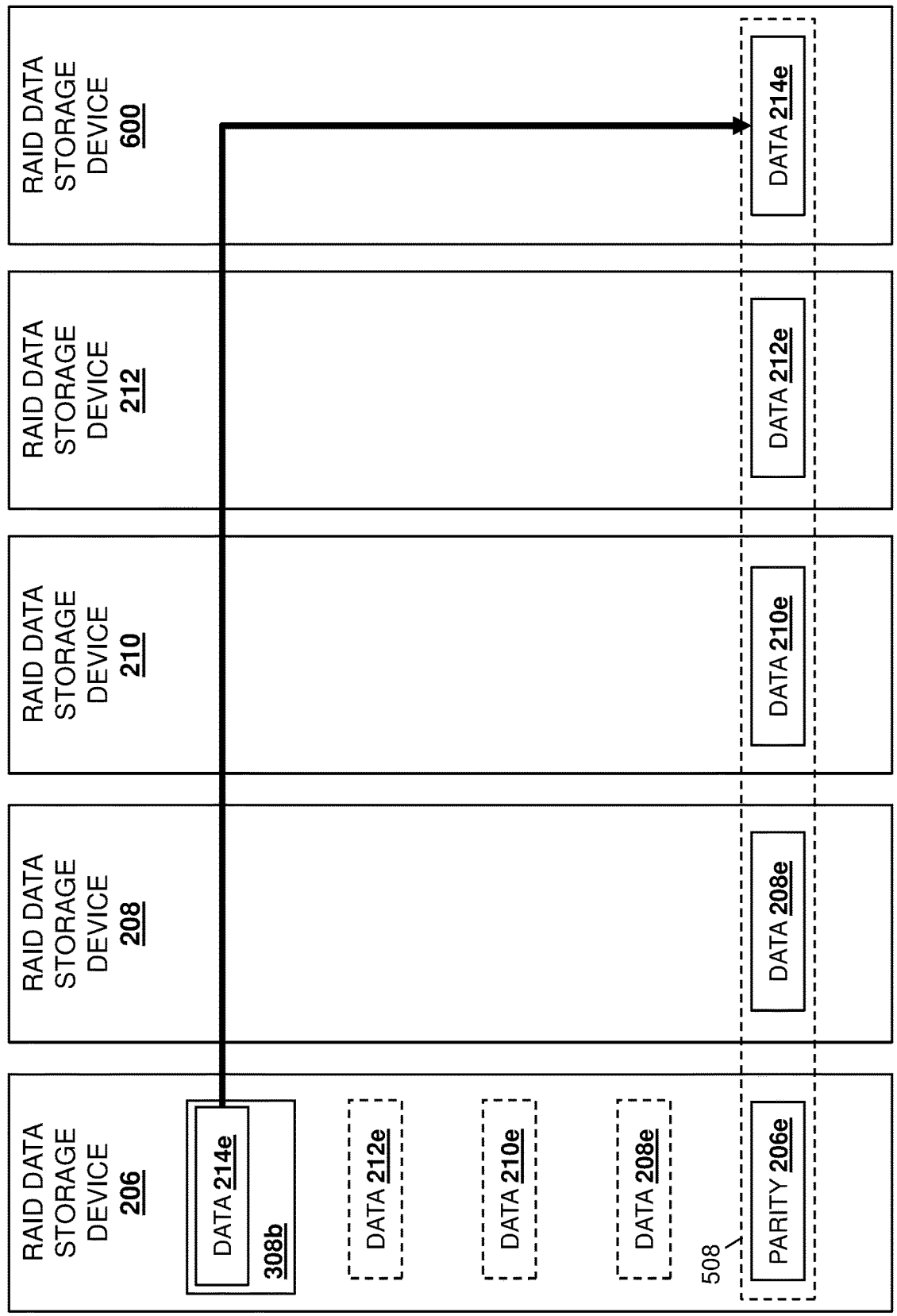
FIG. 13C is a schematic view illustrating an embodiment of the RAID data storage system of FIG. 2 operating during the method of FIGS. 4A and 4B.

The method 400 then proceeds to the fourth iteration of block 420 where the existing RAID data storage device provides the rebuilt data to the replacement storage device for storage as part of the data stripe. In an embodiment, at block 420, the RAID data storage engine 304 in the RAID data storage device 300/206 may inform the RAID data storage device 600 that the rebuilt primary data 214e is stored in its second buffer subsystem 308b. As illustrated in FIG. 13C, in response to being informed that the rebuilt primary data 214e is stored in the second buffer subsystem 308b in the RAID data storage device 300/206, the RAID data storage engine 304 in the RAID data storage device 300/600 may retrieve the rebuilt primary data 214e and store that rebuilt primary data 214e as part of the fifth data stripe 508. For example, at block 420, the RAID data storage engine 304 in the RAID data storage device 300/600 may perform a Direct Memory Access (DMA) operation that writes the rebuilt primary data 214e from the second buffer subsystem 308b in the RAID data storage device 300/206 to the storage subsystem 306 in the RAID data storage device 300/600.

The method then returns to the fifth iteration of decision block 412. As discussed above, as long as additional data stripes need rebuilt data at decision block 412, and an existing RAID data storage device qualifies to rebuild data at block 414, the method 400 may loop such that an existing RAID data storage device performs the data rebuild operations according to blocks 416 and 418, and the replacement RAID data storage device performs the data retrieval operations at block 420, to rebuild data on the replacement RAID data storage device. While example above utilizes the RAID data storage devices that store the "parity strip" within a stripe of data to act as "proxies" and assist in the performance of the data rebuild operations for the RAID data storage device 600, one of skill in the art in possession of the present disclosure will appreciate that existing RAID data storage devices that store primary data in that stripe of data may act as "proxies" and assist in the performance of data rebuild operations for the replacement RAID data storage device while remaining within the scope of the present disclosure as well. In the example provided above, only five RAID data storage devices and five data stripes are illustrated, and each of the RAID data storage devices 206, 208, 210, 212, and 600 perform data rebuild operations to rebuild respective data for each of the data stripes for storage on the RAID data storage device 600. However, one of skill in the art in possession of the present disclosure will appreciate that each of the RAID data storage devices may perform data rebuild operations for multiple different data stripes to rebuild different data for storage on the RAID data storage device 600.

For example, if additional data stripes need rebuilt data at decision block 412, but no existing storage device qualifies to rebuild data at block 414, the method 400 returns to block 406. Continuing with the example provided above, the replacement RAID data storage device 600 is now performing data rebuild operations for the first data stripe 500, and the existing RAID data storage devices are now performing data rebuild operations for the data stripes 502-508, respectively. In this example, with each of the existing RAID data storage devices 206-212 performing data rebuild operations for a single data stripe while the replacement RAID data storage device 600 performs data rebuild operations for a single data stripe, none of the existing RAID data storage devices 206-212 may qualify to rebuild data for the next data stripe (e.g., because it is the "turn" of the replacement RAID data storage device 600 to perform data rebuild operations in order to continue the equal distribution of data rebuild operations amongst the RAID data storage devices 206-212 and 600.)

In such a situation, the method 400 may repeat starting at block 406 in substantially the same manner as discussed above, which continuing with the example above would include the RAID data storage device 600 performing data rebuild operations to rebuild data for a sixth data stripe for storage on the RAID data storage device 600, the RAID data storage device 212 performing data rebuild operations to rebuild data for a seventh data stripe for storage on the RAID data storage device 600, and so on until each of all of the data that was previously stored on the RAID storage device 214 is rebuilt and stored on the RAID data storage device 600. However, as discussed above, unequal distributions of data rebuild operations between the RAID data storage devices 206-212 and 600 may be utilized based on RAID data storage device capabilities, current usage levels of the RAID data storage devices 206-212, and/or any other factors that would be apparent to one of skill in the art in possession of the present disclosure while remaining within the scope of the present disclosure as well. Furthermore, in the event no additional data stripes need rebuilt data at decision block 412, the method 400 proceeds to block 422 where the data rebuild operations end.

Thus, systems and methods have been described that provide for the distribution of data rebuild operations for a replacement RAID data storage device between that replacement RAID data storage device and the existing RAID data storage devices that store the data that is being used to rebuild data for the replacement RAID data storage device. Thus, data rebuild operations for a replacement RAID data storage device are not "piled on" that replacement RAID data storage device, and rather the data rebuild operations may be distributed amongst the replacement RAID data storage device and the existing RAID data storage devices that act as "data rebuild proxies" for the replacement RAID data storage device, thus eliminating the data rebuild bottleneck provided by the replacement RAID data storage device in conventional RAID data storage systems, reducing the bandwidth utilized for data rebuild operations relative to conventional RAID data storage systems, speeding up the data rebuild process relative to conventional RAID data storage systems (the more RAID storage data storage devices in the RAID data storage system, the greater the reduction in the time needed to rebuild the data), and providing other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A distributed Redundant Array of Independent Disks (RAID) storage-device-assisted data rebuild system, comprising:
   a Redundant Array of Independent Disks (RAID) storage system that stores a plurality of data stripes on a plurality of RAID data storage device, wherein the RAID data storage system includes:
      a first RAID data storage device that has been provided in the RAID data storage system in response to unavailability of data in the plurality of data stripes, wherein the first RAID data storage device is configured, for a first data stripe included in the plurality of data stripes stored on the RAID data storage system, to:
         retrieve respective first data for the first data stripe from each of the other RAID data storage devices included in the plurality of RAID data storage device;
         perform an XOR operation on the respective first data for the first data stripe to generate first rebuilt data for the first data stripe; and
         store the first rebuilt data in the first RAID data storage device as part of the first data stripe, and
      wherein a second RAID data storage device included in the plurality of RAID data storage devices is configured, for a second data stripe included in the plurality of data stripes, to:
         retrieve respective second data for the second data stripe from each of a plurality of third RAID data storage devices that are included in the plurality of RAID data storage devices;
         perform an XOR operation on the respective second data for the second data stripe and third data for the second data stripe that is stored on the second RAID data storage device to generate second rebuilt data for the second data stripe; and
         provide the second rebuilt data for storage on the first RAID data storage device as part of the second data stripe.

2. The system of claim 1, wherein the second rebuilt data for the second data stripe is parity data for the second data stripe.

3. The system of claim 1, wherein the second rebuilt data for the second data stripe is primary data for the second data stripe.

4. The system of claim 1, wherein the retrieving the respective second data for the second data stripe from each of the plurality of third RAID data storage devices includes
   transmitting a respective instruction to each of the plurality of third RAID data storage devices to provide their respective second data in a respective buffer subsystem in that third RAID data storage device; and
   reading the respective second data for the second data stripe from the respective buffer subsystem in each of the plurality of third RAID data storage devices.

5. The system of claim 1, wherein the retrieving the respective second data for the second data stripe from each of the plurality of third RAID data storage devices includes
   transmitting a respective instruction to each of the plurality of third RAID data storage devices to write their respective second data in a buffer subsystem in the second RAID data storage device; and
   receiving the respective second data for the second data stripe in the buffer subsystem in the second RAID data storage device.

6. The system of claim 1, wherein the second RAID data storage device is configured, for a third data stripe included in the plurality of data stripes, to:
   retrieve respective fourth data for the third data stripe from each of the plurality of third RAID data storage devices;
   perform an XOR operation on the respective fourth data for third data stripe and fifth data for the third data stripe that is stored on the second RAID data storage device to generate third rebuilt data for the third data stripe; and
   provide the third rebuilt data for storage on the first RAID data storage device as part of the third data stripe.

7. An Information Handling System (IHS), comprising:
   a storage subsystem;
   a processing system that is coupled to the storage subsystem; and
   a memory system that is coupled to the processing system and that includes instructions that, when executed by the processing system, cause the processing system to provide a distributed Redundant Array of Independent Disks (RAID) storage-device-assisted data rebuild engine that is configured to:
  retrieve, from each of a plurality of first RAID data storage devices that are included in a RAID data storage system that stores a plurality of data stripes, respective first data for first data stripe, wherein the retrieving the respective first data for the first data stripe from each of the plurality of first RAID data storage devices includes:
    transmitting a respective instruction to each of the plurality of first RAID data storage devices to provide their respective first data in a respective buffer subsystem in that first RAID data storage device; and
    reading the respective first data for the first data stripe from the respective buffer subsystem in each of the plurality of first RAID data storage devices;
  perform an XOR operation on the respective first data for the first data stripe and second data for the first data stripe that is stored on the storage subsystem to generate first rebuilt data for the first data stripe; and
  provide, to a second RAID data storage device that has been provided in the RAID data storage system in response to unavailability of data in the plurality of data stripes, the first rebuilt data for storage as part of the first data stripe.

8. The IHS of claim 7, wherein the first rebuilt data for the first data stripe is parity data for the first data stripe.

9. The IHS of claim 7, wherein the first rebuilt data for the first data stripe is primary data for the first data stripe.

10. The IHS of claim 7, wherein the distributed RAID storage-device-assisted data rebuild engine that is configured to:
  retrieve, from each of the plurality of first RAID data storage devices, respective second data for second data stripe;
  perform an XOR operation on the respective second data for the second data stripe and third data for the second data stripe that is stored on the storage subsystem to generate second rebuilt data for the second data stripe; and
  provide, to the second RAID data storage device, the second rebuilt data for storage as part of the second data stripe.

11. The IHS of claim 7, wherein the processing system, the memory system, and the storage subsystem are included in a Non-Volatile Memory express (NVMe) storage device.

12. A method for performing distributed Redundant Array of Independent Disks (RAID) storage-device-assisted data rebuilds, comprising:
  retrieving, by a first RAID data storage device that is included in a RAID data storage system that stores a plurality of data stripes from each of a plurality of second RAID data storage devices that are included in the RAID data storage system, respective first data for first data stripe, wherein the retrieving the respective first data for the first data stripe from each of the plurality of second RAID data storage devices includes
    transmitting, by the first RAID data storage device, a respective instruction to each of the plurality of second RAID data storage devices to write their respective first data in a buffer subsystem in the first RAID data storage device; and
    receiving, by the first RAID data storage device, the respective first data for the first data stripe in the buffer subsystem in the first RAID data storage device;
  performing, by the first RAID data storage device, an XOR operation on the respective first data for the first data stripe and second data for the first data stripe that is stored on the first RAID data storage device to generate first rebuilt data for the first data stripe; and
  providing, by the first RAID data storage device to a third RAID data storage device that has been provided in the RAID data storage system in response to unavailability of data in the plurality of data stripes, the first rebuilt data for storage as part of the first data stripe.

13. The method of claim 12, wherein the first rebuilt data for the first data stripe is parity data for the first data stripe.

14. The method of claim 12, wherein the first rebuilt data for the first data stripe is primary data for the first data stripe.

15. The method of claim 12, further comprising:
  retrieving, by the first RAID data storage device from each of the plurality of second RAID data storage devices, respective second data for second data stripe;
  performing, by the first RAID data storage device, an XOR operation on the respective second data for the second data stripe and third data for the second data stripe that is stored on the first RAID data storage device to generate second rebuilt data for the second data stripe; and
  provide, by the first RAID data storage device to the second RAID data storage device, the second rebuilt data for storage as part of the second data stripe.

16. The method of claim 12, wherein the first RAID data storage device is provided by a Non-Volatile Memory express (NVMe) storage device.

* * * * *

UNITED STATES PATENT AND TRADEMARK OFFICE
CERTIFICATE OF CORRECTION

PATENT NO. : 11,157,363 B2
APPLICATION NO. : 16/829124
DATED : October 26, 2021
INVENTOR(S) : Gary Benedict Kotzur et al.

Page 1 of 1

It is certified that error appears in the above-identified patent and that said Letters Patent is hereby corrected as shown below:

In the Specification

Figure 10C:
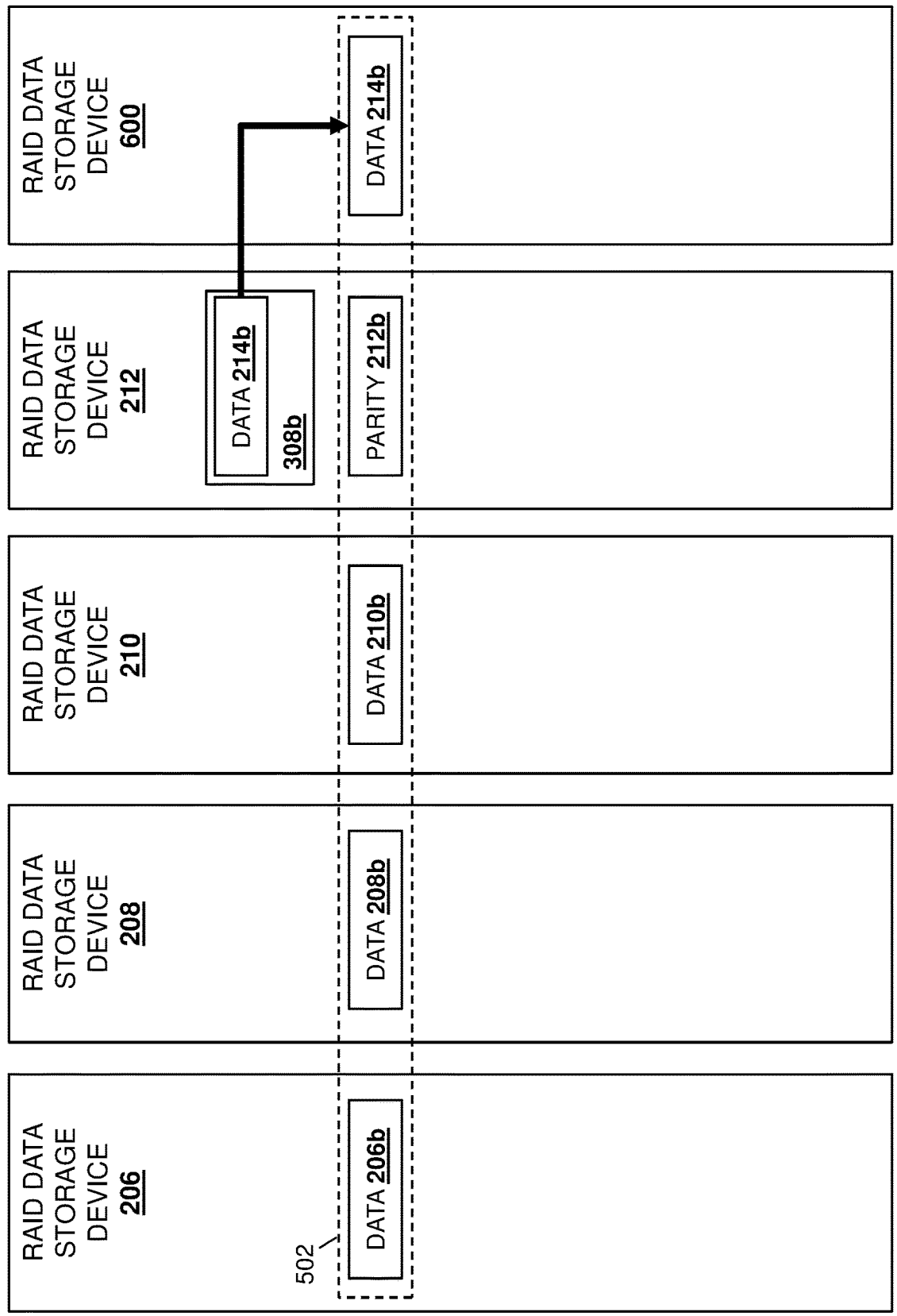

Column 3, Line 44, "FIG. 100" should be changed to --FIG. 10C--;

Column 15, Line 22, "FIG. 100" should be changed to --FIG. 10C--.

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*